United States Patent [19]

Hirschi et al.

[11] Patent Number: 4,470,015
[45] Date of Patent: Sep. 4, 1984

[54] METAL DETECTOR SYSTEM WITH UNDESIRABLE TARGET AND MINERALIZED GROUND DISCRIMINATION

[75] Inventors: Richard E. Hirschi, Sweet Home; George C. Payne, Salem, both of Oreg.

[73] Assignee: Teknetics, Inc., Lebanon, Oreg.

[21] Appl. No.: 324,866

[22] Filed: Nov. 25, 1981

[51] Int. Cl.³ .................... G01V 3/10; G01N 27/72; G01R 33/12
[52] U.S. Cl. .................... 324/329; 324/233; 324/239
[58] Field of Search ............... 324/329, 326, 327, 233, 324/239; 331/65; 340/38 C

[56] References Cited

U.S. PATENT DOCUMENTS

| | | | |
|---|---|---|---|
| 4,030,026 | 6/1977 | Payne | 324/329 |
| 4,128,803 | 12/1978 | Payne | 324/329 |
| 4,204,160 | 5/1980 | Voll | 331/65 X |
| 4,344,034 | 8/1982 | Randolph, Jr. | 324/329 |

*Primary Examiner*—Gerard R. Strecker
*Assistant Examiner*—Warren S. Edmonds
*Attorney, Agent, or Firm*—Christensen, O'Connor, Johnson & Kindness

[57] ABSTRACT

A synchronous demodulator subsystem produces a ground balance pulse and a discriminate pulse each time a detector head housing the receive coil and an associated transmit coil passes over a metallic object (e.g., a target) buried in the ground. In one form, a pair of synchronous demodulators produce $V_X$ and $V_R$ signals, each of which includes a pulse each time the detector head passes over a target. The $V_X$ and $V_R$ signals are combined to produce the ground balance and discriminate pulses. Alternatively, a pair of synchronous demodulators are used to directly produce the ground balance and discriminate pulses. The polarity of the discriminate pulse is dependent upon on whether the target is a desirable or an undesirable target. Contrariwise, the polarity of the ground balance pulse is always the same. Further the ground balance pulse signal contains very little ground mineralization information whereas the discriminate pulse signal may contain a significant amount of ground mineralization information when the target is buried in mineralized ground. The ground balance and discriminate pulses are filtered to remove ground mineralization information and converted into in-phase or 180 degrees out-of-phase ringing signals. The ground balance ringing signal is modulated in a triangle modulator and the result divided into the discriminate ringing signal. The result of the division is a series of pulses on one or the other of two lines depending upon whether the target is a desirable or undesirable target. The division pulses control the polarity and magnitude of a DC voltage produced by an integrator, which in turn controls a corresponding increase or decrease in the level of an audio signal.

40 Claims, 13 Drawing Figures

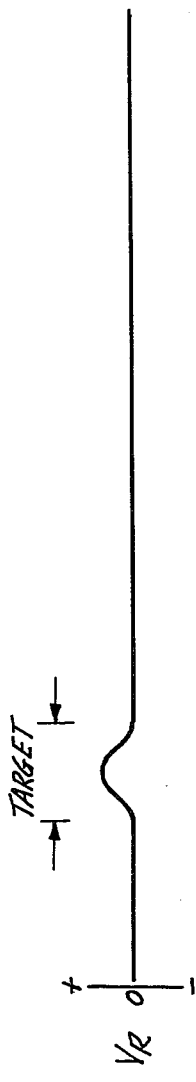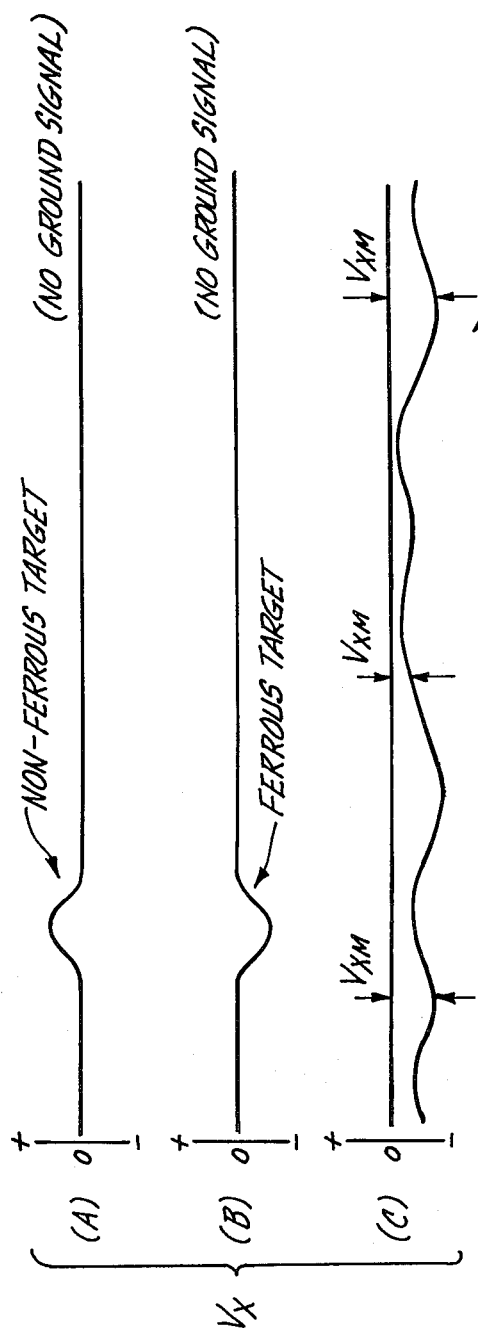

METAL DETECTOR SYSTEM WITH UNDESIRABLE TARGET AND MINERALIZED GROUND DISCRIMINATION

TECHNICAL AREA

This invention is directed to metal detectors and, more particularly, metal detectors having the ability to discriminate against undesirable types of metal objects (e.g., targets) and mineralized ground.

BACKGROUND OF THE INVENTION

As used in this application the term "metal detector" is generally directed to metal detectors of the type used by individuals to locate buried metal objects, particularly valuable metal objects. Such metal detectors are to be contrasted with other types of metal detectors, such as military metal detectors used to locate mines, commercial metal detectors used to locate pipes and other large metallic objects, and security metal detectors used in airports and other areas to locate lethal weapons (such as knives and guns). While some of the principles involved in the present invention may be useful in these other types of metal detectors, it is to be kept in mind that the invention was developed for use with metal detectors used to locate valuable metal objects buried in mineralized ground and finds its main use in such detectors.

In the past two major kinds of valuable metal type metal detectors have been marketed—beat frequency oscillator metal detectors and induction balance metal detectors. The present invention is directed to induction balance type metal detectors, which are sometimes also referred to as transmit-receive (T/R) type metal detectors.

Induction balance metal detectors include transmit and receive coils, plus other related coils (such as feedback and null coils) mounted in a detector head. Preferably the main coils, i.e., the transmit, receive and feedback coils, are coaxially mounted. In some detectors these coils are coplanar, as well as coaxial. In any event, the transmit coil is driven by an oscillator, and the coils are formed, sized and positioned such that the receive coil produces substantially no output signal in the absence of a metallic object (including mineralized ground) disrupting the magnetic field produced by the transmit coil. Metallic objects of both a ferrous and a nonferrous nature disrupt the magnetic field produced by the transmit coil; however, in different manners. In the case of ferrous objects, the magnetic field is concentrated by the ferrous object. In the case of a nonferrous object, eddy currents are produced in the object that, in turn, produce magnetic fields. The eddy current produced magnetic fields dissipate the magnetic field produced by the transmit coil, in the region of the object. In either case, the magnetic field produced by the transmit coil is disrupted in a manner that generates a voltage in the receive coil. If the ground is mineralized, it generates a voltage in the receive coil having some similarity to that produced by a ferrous target object. (While the receive coil voltage is similar in some respects, it is dissimilar in others. For example, a ferrous target object creates a voltage pulse when the detector head passes over the target whereas the ground produced voltage is relatively uniform when compared to a metal object.)

The transmit coils of early type induction balance or T/R type metal detectors were driven by a relatively high frequency oscillator until it was discovered that instrument sensitivity was improved when an oscillation frequency in the audio frequency range was used. Audio frequencies in the few thousand Hz range were found to be the best. Even though this change improved the sensitivity of metal detectors, early metal detectors did not operate satisfactorily in mineralized group. More specifically, as noted above, mineralized ground disrupts the magnetic field produced by the transmit coil and generates a voltage in the receive coil in a manner similar to a ferrous metallic object. As a result, it is difficult and, in many instances impossible, to locate target metal objects in mineralized ground.

The ground mineralization problem in the valuable object metal detector field remained until a technique for excluding the effect of ground mineralization was developed by George C. Payne. This technique is described in U.S. Pat. No. 4,030,026, entitled "Sampling Metal Detector." While the technique described in U.S. Pat. No. 4,030,026 eliminated the undesirable effect of mineralized ground, only the existence of a metal target was indicated. Information about whether the target was potentially desirable or clearly undesirable, the depth of the target, etc. was not produced. Later metal detector developments provided this information. For example, the metal detector described in U.S. Pat. No. 4,128,803, issued to George C. Payne for "Metal Detector System With Ground Effect Rejection," produces an output signal whose polarity indicates the nature of the metal forming the target, i.e., ferrous or nonferrous and, thus, whether the target is potentially desirable or clearly undesirable. More precisely, the technique described in U.S. Pat. No. 4,128,803 results in a metal detector that can be adjusted to discriminate against some nonferrous targets as well as ferrous targets located in mineralized ground. Thus, undesirable targets can be avoided. As a result, metal detector users are not required to dig up all metal targets in order to determine whether a specific target is valuable or worthless. Rather only targets that are potentially desirable need be dug up. A subsequent development, also by George C. Payne, provides information about the depth of the target, i.e., the distance between the detector head and the buried target.

As will be readily appreciated from the foregoing summary of advances in the metal detector field during the past decade, metal detectors have advanced from crude instruments only usable in nonmineralized soil to sophisticated instruments usable in mineralized soil. The present invention is directed to an alternative apparatus for discriminating against undesirable targets and mineralized ground. That is, in general, the present invention provides the same result as that obtained by the apparatus described in U.S. Pat. No. 4,128,803, albeit in a somewhat different manner.

SUMMARY OF THE INVENTION

In accordance with this invention, a metal detector system with undesirable target and mineralized ground discrimination is provided. A synchronous demodulator subsystem demodulates the signal developed in a receive coil coupled to an oscillator driven transmit coil and produces a ground balance signal and a discriminate signal that include target information each time a detector head housing the transmit and receive coils passes over a metallic object (e.g., a target) buried in the ground. While the phase of the ground balance signal is always the same, the phase of the discriminate signal is dependent upon whether the target is desirable or undesirable. The ground balance and discriminate signals are processed, in a manner that discriminates against ground mineralization information and target pulses produced by undesirable targets (such as nails, pull tabs, for examples), to produce an indication when the phase of the discriminate signal denotes that the target is a desirable target.

In one form of the invention, the synchronous demodulator subsystem includes two synchronous demodulators that produce $V_X$ and $V_R$ signals, each of which include target information each time the detector head passes over a target. The $V_X$ and $V_R$ signals are combined to produce the ground balance and discriminate signals. In an alternate form of the invention, the synchronous demodulator subsystem includes two synchronous demodulators that directly produces the ground balance and discriminate signals. Regardless of how created, the discriminate signal is divided by the ground balance signal and the result controls the production of a series of pulses on one or the other of two output lines depending upon whether the target is a desirable or an undesirable target. The pulses, in turn, control the polarity and magnitude of a DC signal, which, in turn, controls the magnitude of an audio signal.

In accordance with further aspects of this invention, preferably, the ground balance and discriminate signals are first produced in pulse form and, then, converted into ringing signal form. Further, the ground balance signal is modulated prior to being divided into the discriminate signal.

In accordance with other aspects of this invention, preferably, the ground balance signal is triangularly modulated in a manner that produces a triangular signal whose magnitude tracks the envelope of the ground balance ringing signal.

In accordance with still further aspects of this invention, the DC signal is produced by an integrator integrating positive or negative pulses, the polarity of which depends on which of the two output pulses occur when the discriminate signal is divided by the ground balance signal, which, in turn, depends upon the desirable/undesirable nature of the target. Further, preferably, pulses applied to the integrator in accordance with the output of the divider have a magnitude that tracks the pulsations of the ground balance ringing signal. As a result, the output of the integrator tracks the envelope of the ground balance ringing signal, whereby, the audio tone increases or decreases in accordance with changes in the magnitude of the ground balance ringing signal. In this regard, preferably, the quiesent state of the audio signal is at some prescribed level from which it increases or decreases in intensity in accordance with the magnitude and polarity of the output of the integrator.

In accordance with still other aspects of this invention, preferably, the integrator is disabled in the absence of a ground balance ringing signal. As a result, the change in the intensity of the audio signal only occurs when the detector head passes over a target.

In accordance with yet still further aspects of this invention, preferably, a mode control is provided that allows either the ground balance signal or the output of the integrator to control the audio signal, whereby alternate modes of operation are provided. Specifically, in one mode of operation, any target, as denoted by the production of a ground balance signal, creates a single polarity change in the audio signal. In the other mode of operation, the nature, e.g., desirable or undesirable, of the target controls the increase or decrease in the audio signal.

As will be readily appreciated from the foregoing summary, the invention provides a metal detector system with undesirable target and mineralized ground discrimination. Depending upon how the metal detector system is adjusted, it can discriminate against only ferrous objects, such as nails, for example, or against ferrous objects plus certain types of nonferrous objects, such as pull tabs, aluminium foil, etc. Depending upon the form of the invention, this result is accomplished by controlling either relative magnitudes of the $V_R$ and $V_X$ signals when they are combined to produce the discriminate signal as the detector head passes over a target, or the phase relationship between the detected signal and the demodulation signal. More specifically, in the form of the invention wherein $V_X$ and $V_R$ signals are combined, the level of the $V_R$ signal with respect to the $V_X$ signal is controlled in a manner that produces a discriminate signal for certain types of nonferrous objects having a polarity similar to that produced by ferrous objects. In the form of the invention wherein the ground balance and discriminate signals are produced directly by a pair of synchronous demodulators a similar result is accomplished by controlling the phase relationship between the unknown and demodulation signals applied to the demodulators. As a result, certain types of nonferrous targets as well as ferrous targets are discriminated against. This result is particularly desirable in the valuable metal detector art because worthless nonferrous targets can be discriminated against, such as pull tabs, aluminum foil, etc., as well as worthless ferrous targets, such as nails.

BRIEF DESCRIPTION OF THE DRAWINGS

The foregoing objects and many of the attendent advantages of this invention will become more readily appreciated as the same becomes better understood by reference to the following detailed description when taken in conjunction with the accompanying drawings wherein:

FIG. 7 is a waveform diagram illustrating the signal formed on the output of the $V_R$ demodulator when the detector head passes over a metal object (e.g., a target);

FIG. 8, lines A-C is a series of three waveforms illustrating the type of signals formed on the output of the $V_X$ demodulator by nonferrous targets and ferrous targets buried in nonmineralized ground, and mineralized ground that does not contain a target;

DESCRIPTION OF THE PREFERRED EMBODIMENT

Figure 1:
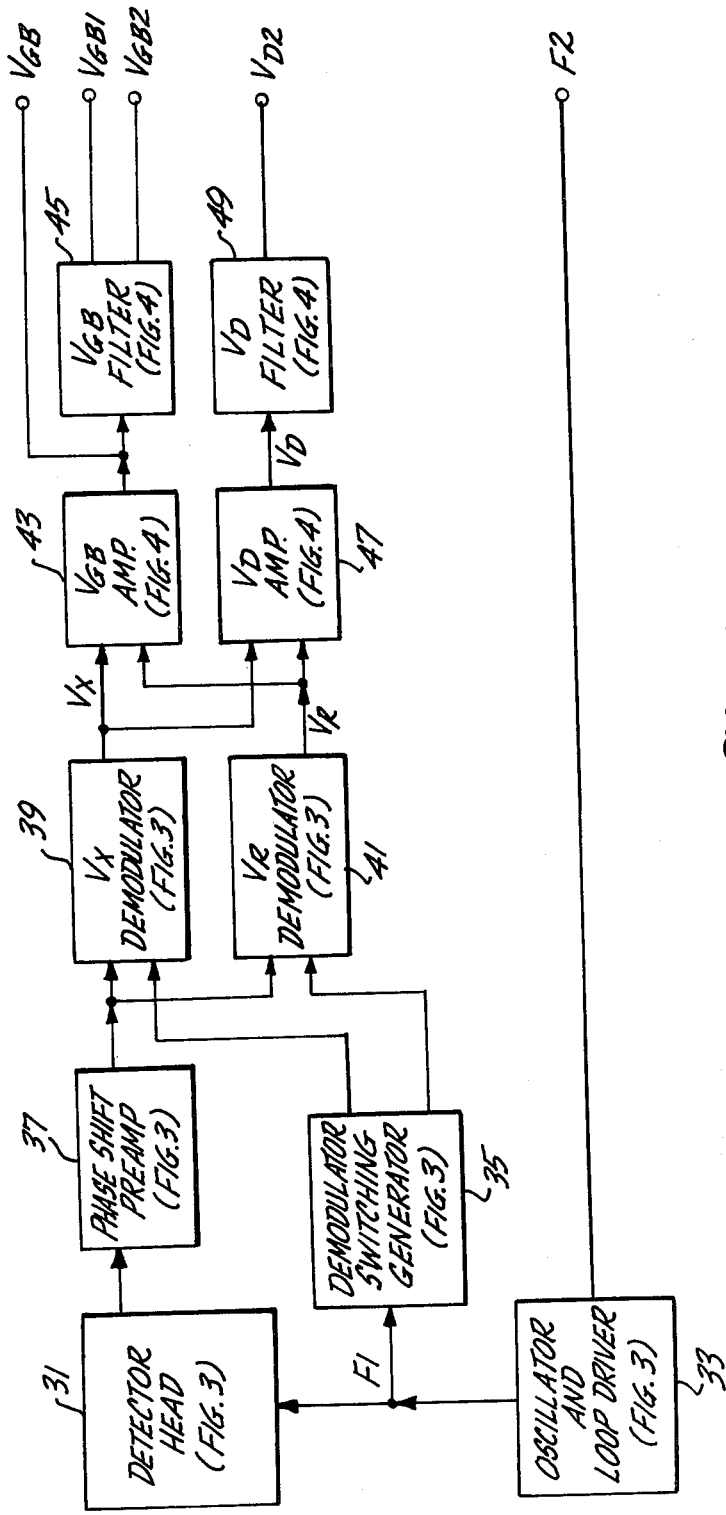
FIG. 1 is a block diagram of an embodiment of a signal production subsystem suitable for use in a metal detector system formed in accordance with the invention.
Figure 2:
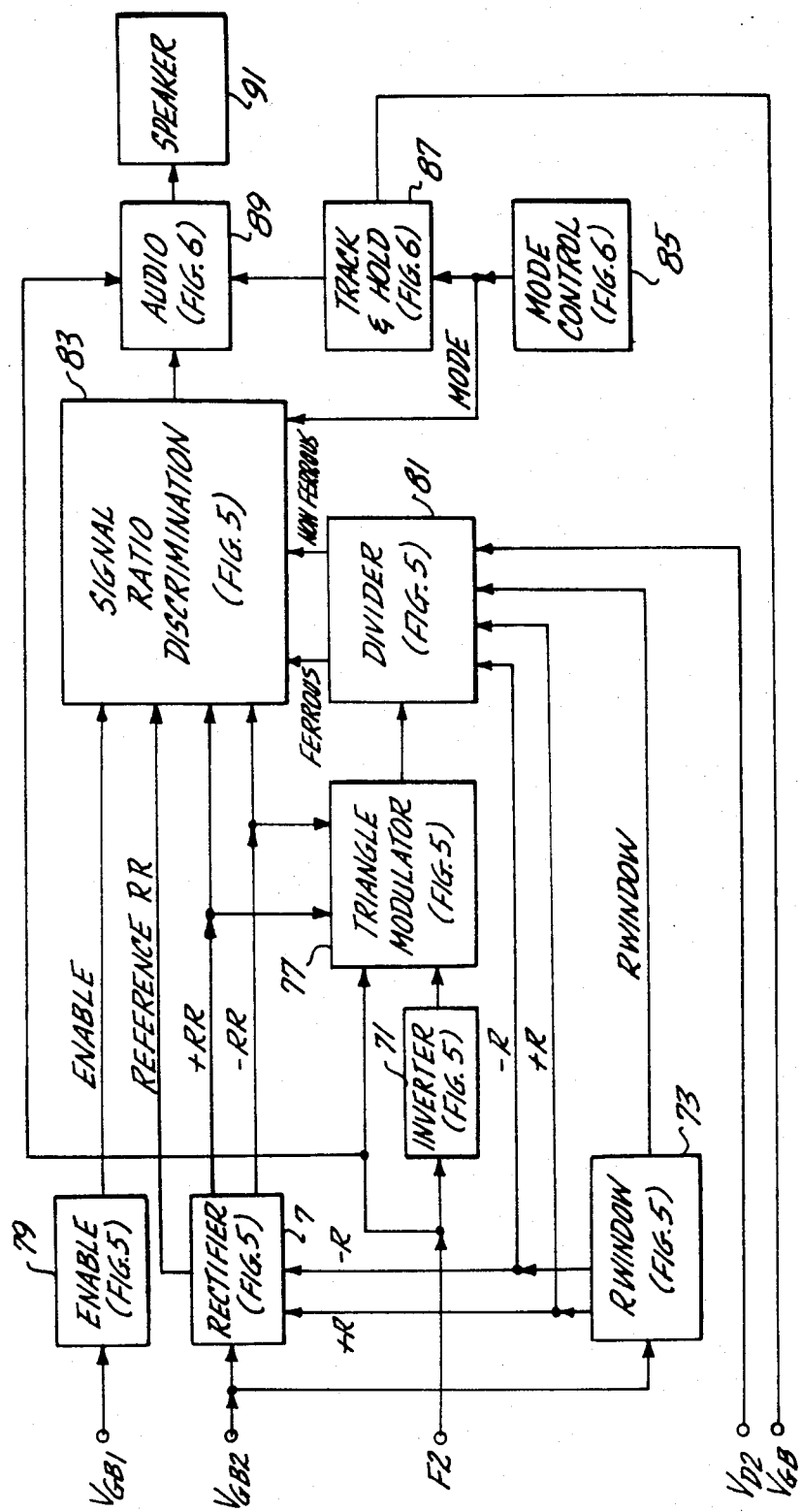
FIG. 2 is a block diagram of a signal processor suitable for use in a metal detector system formed in accordance with the invention.

In general, a metal detector system with undesirable target and mineralized ground discrimination formed in accordance with the invention includes a signal production subsystem (FIG. 1 or FIG. 13) and a signal processor (FIG. 2). The signal production subsystem, as hereinafter described in more detail, includes a detector head that houses the transmit, receive, feedback and null coils of a T/R or induction balance type metal detector. The transmit coil is driven by an oscillator (which also forms part of the signal production subsystem) and the coils are designed and positioned such that the output of the receive coil is a null in the absence of a metal object positioned so as to disrupt the field produced by the transmit coil in a manner that is detectable by the receive coil. (In this instance the term metal object includes mineralized ground as well as metal targets since mineralized ground will create a detectable disruption in the magnetic field produced by the transmit coil regardless of whether or not a metal target is buried in the mineralized ground.)

In one form (FIG. 1), the signal production subsystem includes demodulators that demodulate the output of the receive coil in a manner that produces two voltage signals, denoted $V_R$ and $V_X$, quadrature related to the receive coil current. When the detector head passes over a metal target, including a metal target buried in mineralized ground, the $V_R$ and $V_X$ signals contain target information, in the form of a pulse. The signal production subsystem includes amplifiers that differentially combine the $V_X$ and $V_R$ signals and produce two signals, $V_{GB}$ and $V_D$, which also include a pulse when the detector head passes over a metal target. In an alternative form (FIG. 13) the signal production subsystem includes demodulators that directly produce the $V_{GB}$ and $V_D$ signals. Regardless of how produced, in the case of $V_{GB}$, the pulse polarity is always in the same direction and the $V_{GB}$ signal contains substantially no ground mineralizaton information. Contrariwise, the polarity of the $V_D$ pulse depends upon the nature of the target. Targets being discriminated against cause the $V_D$ target pulse to have one polarity, e.g., positive, and targets that are not being discriminated against cause the $V_D$ pulse to be of the opposite polarity, e.g., negative. In addition, the $V_D$ signal contains ground mineralization information whenever the detector head is passing over mineralized ground. The $V_{GB}$ signal is filtered to convert the $V_{GB}$ target pulse into partial ($V_{GB1}$) and full ($V_{GB2}$) ringing signals. A ringing signal is, of course, a sinusoidal burst. Further, the $V_D$ signal is filtered to remove some of the ground mineralization information therefrom and to convert the target (pulse) component into the form of a ringing signal. The $V_{D2}$ ringing signal is produced in a manner that is phase correlated with the $V_{GB}$ ringing signal, i.e., these two signals are in phase or 180 degrees out of phase. The $V_{D2}$ signal along with the $V_{GB}$, $V_{GB1}$ and $V_{GB2}$ signals are applied to the signal processor. The signal processor also receives a clock signal, denoted F2, produced by the signal production subsystem and having a frequency substantially higher (twenty times higher, for example) than the frequency of the ringing signals just described.

The signal processor rectifies the $V_{GB2}$ signal and creates a pair of bi-polar pulsating signals, which are combined to create an envelope signal that tracks the envelope of the $V_{GB2}$ signal. The envelope signal, in turn, controls the magnitude of a triangular signal. As a result, a triangular signal that tracks the envelope of the $V_{GB2}$ signal is produced. The triangular signal is divided into the $V_{D2}$ signal and the result utilized to control the occurrence of pulses on one of two outputs. More specifically, pulses are produced on one output if the target is of the type being discriminated against and pulses are produced on the other output if the target is of the type not being discriminated against. Regardless of the output on which pulses occur, the pulses are used to modulate the bi-polar pulsating signals with respect to a reference level. More specifically, pulses on the output which denote that the target is of the type being discriminated against modulate the negative pulsating signal and pulses on the output denoting that the target is of the type not being discriminated against modulate the positive pulsating signal. The resultant modulated pulsating signal pulses are integrated to create a positive or negative DC signal that controls the increase or decrease in the output of an audio circuit and, thus, the intensity of an audio signal.

In addition, the signal processor includes a mode control that produces a bi-stable mode signal. The state of the mode signal controls whether the $V_{GB}$ signal or the output of the integrator controls the magnitude of the output of the audio circuit. As a result, either the presence of a target regardless of its nature can increase the audio signal, or the nature of the target, i.e., whether the target is a desirable or an undesirable target; can increase or decrease the audio signal. In this way a user can first be apprised of the presence of a target and, then, of the desirable/undesirable nature of the target.

FIG. 1 is a block diagram of a preferred embodiment of a signal production subsystem suitable for use in a metal detector system formed in accordance with the invention and comprises: a detector head 31; an oscillator and loop driver 33; a demodulator switching generator 35; a phase shift preamplifier 37; a $V_X$ demodulator 39; a $V_R$ demodulator 41; a $V_{GB}$ amplifier 43; a $V_{GB}$ filter 45; a $V_D$ amplifier 47; and, a $V_D$ filter 49. The detector head 31 houses the transmit and receive coils (as well as feedback and null coils, as described below)

and the oscillator and loop driver 33 produces two signals denoted F1 and F2. F1 is the oscillating signal that drives the transmit coil and causes it to produce an oscillating magnetic field; and, F2 is used in the signal processor in the manner described below. F1 is also applied to the demodulator switching generator 35. Preferably, the frequency of F1 is in the KHz range and F2 is in the several hundred Hz range. In one actual embodiment of the invention, the frequency of F1 was chosen to be 6592.5 Hz±3.3 Hz and F2 was chosen to be 412 Hz.

The phase shift preamplifier 37 is connected to the receive coil and phase shifts received signals by a predetermined amount. The output of the phase shift preamplifier 37 is applied to the unknown signal inputs of the $V_X$ and $V_R$ demodulators 39 and 41, which also receive demodulation signals from the demodulator switching generator 35 at their demodulation signal inputs. The output of the demodulators is such that ground mineralization information, contained in the phase shifted received signal, is substantially deleted in the $V_R$ demodulator 41. Thus, the output of the $V_R$ demodulator (denoted the $V_R$ signal) is, generally, a "clean" signal, i.e., the $V_R$ signal has substantially no ground mineralization component. Contrariwise, the output of the $V_X$ demodulator (denoted the $V_X$ signal) is a "dirty" signal, i.e., it contains a ground mineralization component when the detector head is moved over mineralized ground. While the $V_R$ signal is a clean signal and the $V_X$ signal is a dirty signal, both signals contain target information (in the form of a pulse) when the detector head passes over a target. Further, the target components of the $V_R$ and $V_X$ signals are quadrature related to the received signal that produced the $V_R$ and $V_X$ signals.

Figure 4:
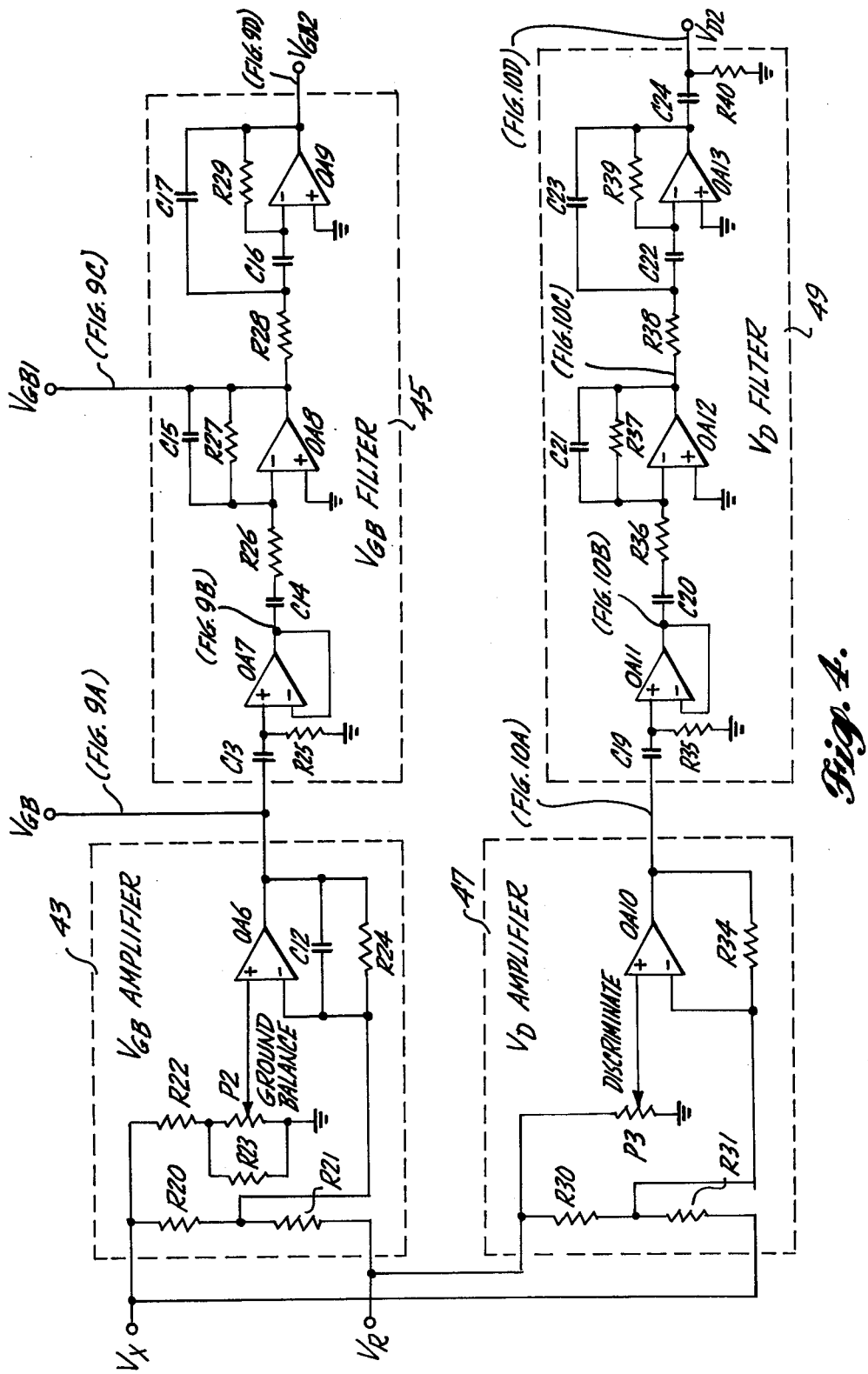
FIG. 4 is a schematic diagram of a $V_{GB}$ amplifier, a $V_{GB}$ filter, a $V_D$ amplifier and a $V_D$ filter suitable for use in the signal production subsystem illustrated in FIG. 1.

The $V_R$ and $V_X$ signals are applied to the $V_{GB}$ amplifier 43 and to the $V_D$ amplifier 47. The $V_{GB}$ amplifier is a differential amplifier, i.e., it amplifies the difference between the $V_R$ and $V_X$ signals. As illustrated in FIG. 4 and hereinafter described, the $V_{GB}$ amplifier includes a ground balance potentiometer that allows the amplifier to be adjusted to delete any remaining ground mineralization information contained in the $V_R$ signal. (As noted above ground mineralization information is primarily contained in the $V_X$ signal.) Thus, the output of the $V_{GB}$ amplifier, denoted the $V_{GB}$ signal, contains a very, very small, if any, ground mineralization component. As will be better understood from the following description, the $V_{GB}$ amplifier is configured such that its sensitivity to the $V_X$ input signal is continuously adjustable by a ground balance potentiometer so as to be of opposite polarity at the two extremes of the adjustment range. In addition to being applied to the signal processor, the $V_{GB}$ signal is applied to the $V_{GB}$ filter 45. As will be better understood from the following description, the $V_{GB}$ signal is a pulse signal that occurs when the detector head passes over a target. The $V_{GB}$ filter includes high and bandpass filters with steep low frequency roll-off characteristics. These filters convert the $V_{GB}$ signal from pulse form into a partial ringing signal formed of three alternating polarity sinusoidal pulses and then into a fully ringing signal, i.e., a decaying sinusoidal burst signal. These signals, denoted the $V_{GB1}$ and $V_{GB2}$ signals, respectively, are applied to the signal processor.

The $V_D$ amplifier is also a differential amplifier, i.e., it amplifies the difference between the $V_R$ and $V_X$ signals. As also illustrated in FIG. 4 and hereinafter described, the $V_D$ amplifier is similar to the $V_{GB}$ amplifier. However, rather than including a ground balance potentiometer, the $V_D$ amplifier includes a discriminate potentiometer. As will be better understood from the following description, the $V_D$ amplifier is configured such that its sensitivity to the $V_R$ input signal is continuously adjustable by a discrimiate potentiometer so as to be of opposite polarity at the two extremes of the adjustment range. The discriminate potentiometer is used in a similar manner to the ground balance potentiometer, except that it is adjusted so that the signal produced at the output of the $V_D$ amplifier in response to the detector head passing over a target is of a polarity that determines whether the target is of the type being discriminated against or is of the type not being discriminated against. In this regard, as noted above, when the detector head passes over a target the $V_X$ and $V_R$ signals include correlated pulses. The $V_R$ signal is always of the same polarity, as illustrated in FIG. 7. Contrariwise, the $V_X$ signal has a polarity that is dependent upon the ferrous or nonferrous nature of the target. Nonferrous targets create a positive $V_X$ pulse and a ferrous target creates a negative $V_X$ pulse. These pulses are illustrated in FIG. 8A and FIG. 8B, respectively. FIG. 8C illustrates the ground signal, $V_{XM}$, present in the $V_X$ signal when the target is buried in mineralized ground. This signal, of course, is summed with the target component of the $V_X$ signal when the detector head passes over a metal target buried in mineralized ground. In any event, the ground mineralization component of the $V_X$ signal has the same polarity as a ferrous target component, i.e., negative. (Obviously, the polarities of the $V_R$, and the various components of the $V_X$ signal are all relative. If desired, an embodiment of the invention can be formed such that all of these polarities are inverted.)

As noted above, the $V_D$ amplifier differentially combines the $V_R$ signal and the $V_X$ signal, which includes a target component (when the detector head passes over a target) and a ground mineralization component (when the target is buried in mineralized ground). The $V_D$ amplifier can be adjusted so that the $V_R$ pulse created by the target is combined with the $V_X$ pulse created by the target in a manner such that a corresponding positive pulse is produced in the output of the $V_D$ amplifier when the target is ferrous and a negative pulse is produced when the target is nonferrous. Further, the signals can be combined such that some nonferrous targets create a pulse on the output of the $V_D$ amplifier similar to that created by ferrous targets, i.e., a positive pulse. In this way the $V_D$ amplifier can be set to produce an output that discriminates against some nonferrous targets as well as ferrous targets, if desired. In any case, of course, the output of the $V_D$ amplifier still contains some ground mineralization information, as well as a target component when the detector head passes over a target buried in mineralized ground.

The $V_D$ signal is applied to the $V_D$ filter 49. The $V_D$ filter is substantially identical to the $V_{GB}$ filter and includes high and bandpass filters with steep low frequency roll-off characteristics. These filters convert the pulse component of the $V_D$ signal from pulse form into a partially ringing signal formed of three alternating polarity sinusoidal pulses and, then, into a full ringing signal, i.e., a decaying sinusoidal burst signal. The latter signal, denoted the $V_{D2}$ signal, is applied to the signal processor.

The $V_{D2}$ and the $V_{GB2}$ ringing signals are produced in a phase correlated manner. That is, these two signals are either in phase or 180 degrees out of phase. Since the $V_{GB}$ pulse produced on the output of the $V_{GB}$ amplifier when the detector head passes over a target is always of the same polarity, the first excursion and, thus, the polarity of subsequent excursions, of the $V_{GB2}$ signal are always of the same polarity. Contrariwise, since the polarity of the target pulse component formed on the output of the $V_D$ amplifier 47 varies from positive to negative in accordance with the adjustment of the discriminate potentiometer of the $V_D$ amplifier and the nature of the target, as described above, the polarity of the first excursion signal and, thus, the polarity of subsequent excursions, of the $V_{D2}$ signal is dependent upon whether the target is or is not the type of target being discriminated against. As a result, $V_{D2}$ ringing signals created by the detector head passing over a metal target are either in phase or 180 degrees out of phase with the $V_{GB2}$ ringing signals. It is this phase relationship that ultimately determines whether that target is or is not being discriminated against.

Figure 3:
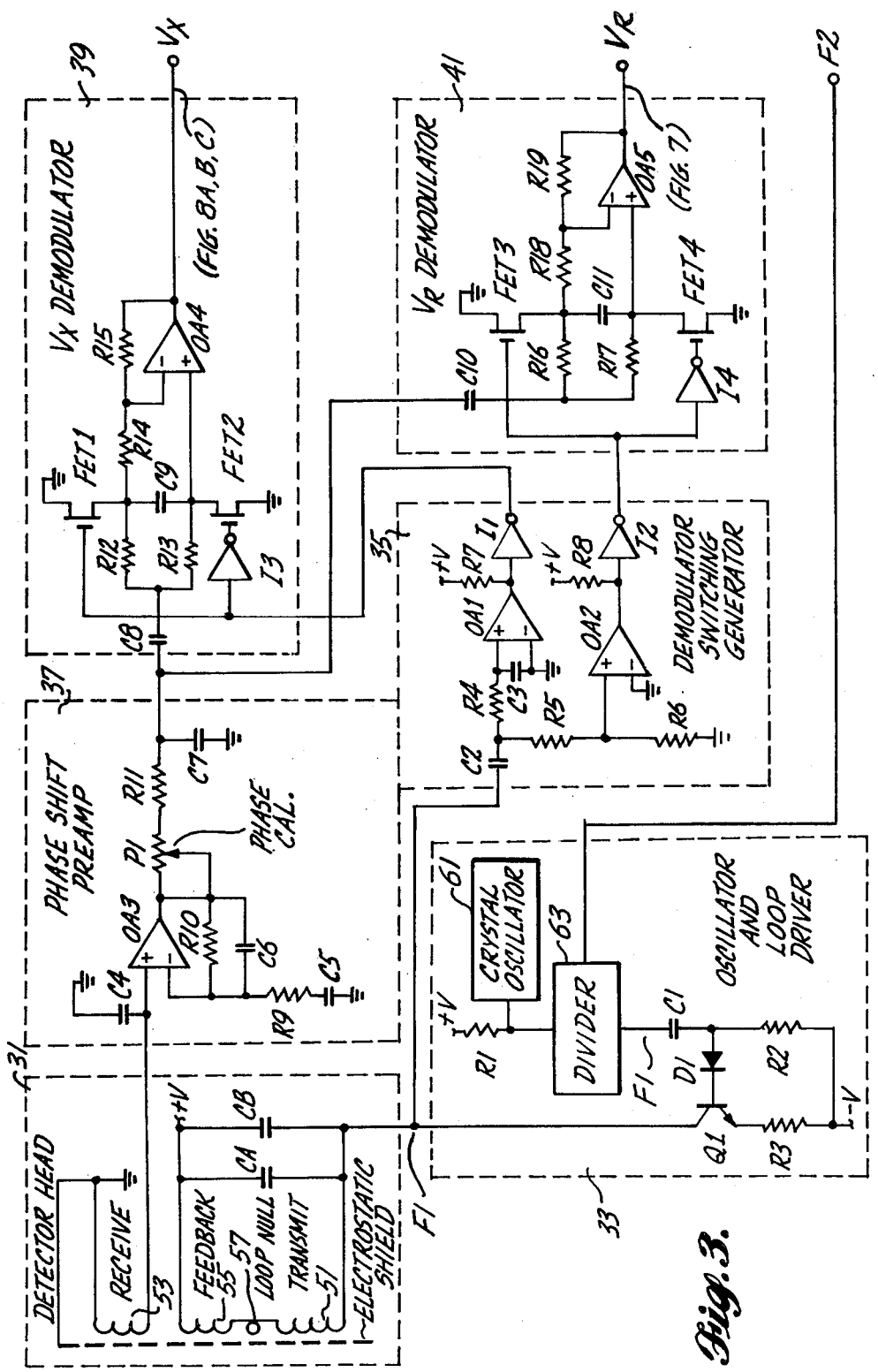
FIG. 3 is a schematic diagram of a detector head, an oscillator and loop driver, a demodulator switching generator, a phase shift preamplifier, a $V_X$ demodulator and a $V_R$ demodulator suitable for use in the signal production subsystem illustrated in FIG. 1.

FIG. 3 is a schematic diagram illustrating: a detector head 31; an oscillator and loop driver 33; a demodulator and switching generator 35; a phase shift preamplifier 37; a $V_X$ demodulator 39; and, a $V_R$ demodulator 41 suitable for use in the signal production subsystem illustrated in FIG. 1. The detector head 31 houses: the transmit coil 51; and, the receive coil 53. Also housed in the detector head are: a feedback coil 55; a loop null coil 57; and, two trimming capacitors designated CA and CB. The transmit 51, loop null 57 and feedback 55 coils are connected in series in that order. CA and CB are connected in parallel with one another and across the series connected transmit, loop null and feedback coils. The signal produced by the oscillator and loop driver 33 in the manner hereinafter described is connected to the transmit coil end of this circuit. The feedback coil end of the circuit is connected to a positive voltage source designated +V. One end of the receive coil 53 is connected to the input of the phase shift preamplifier 37. The other end of the receive coil 53 is connected to ground and to an electrostatic shield that is positioned to protect the coils from unwanted interference.

The transmit, feedback, receive and loop null coils, and CA and CB, are sized, positioned and adjusted, as appropriate, such that the magnetic coupling between the transmit and receive coils is essentially zero in the absence of a metallic and/or magnetic object disrupting the magnetic field produced by the transmit coil when it is driven by the oscillating output of the oscillator and loop driver 33. This null situation occurs in air and nonmineralized ground that does not contain a metallic target. Mineralized ground, regardless of whether it does or does not contain a metallic target, disrupts the magnetic field produced by the transmit coil in a manner that generates a voltage in the receive coil.

The oscillator and loop driver 33 illustrated in FIG. 3 comprises: a crystal oscillator 61; a divider 63; a capacitor designated C1; three resistors designated R1, R2 and R3; a diode designated D1; and an NPN transistor designated Q1. The output of the oscillator 61 is connected to the input of the divider 63 and through a pull up resistor, R1, to +V. The divider 63 divides down the high frequency output of the crystal oscillator and produces the F1 and F2 signals. As noted above, preferably, the F1 signal is in the few thousand Hz range and the F2 signal is in the several hundred Hz range.

The F1 signal is applied to a loop driver circuit formed by C1, R2 and R3, D1 and Q1. More specifically, the F1 signal is applied through C1 in series with R2 to a negative voltage source designated −V. The junction between C1 and R2 is connected to the anode of D1. The cathode of D1 is connected to the base of Q1. The emitter of Q1 is connected through R3 to −V. The collector of Q1 is connected to the junction between the transmit coil 51, and CA and CB (housed in the detector head 31). Thus, the oscillating signal (F1) that drives the transmit coil is produced at the collector of Q1.

The demodulator switching generator 35 illustrated in FIG. 3 comprises: two capacitors designatd C2 and C3; five resistors designated R4, R5, R6, R7 and R8; two comparators designated OA1 and OA2; and, two inverters designated I1 and I2. The same signal that is applied by the oscillator and loop driver 33 to the transmit coil 51 is applied through C2 in series with R4 to the noninverting input of OA1. C3 is connected across the inverting and noninverting inputs of OA1; and, the inverting input of OA1 is connected to ground. The output of OA1 is connected to +V through a pull up resistor, R7. In addition, the output of OA1 is connected to the input of I1. The junction between C2 and R4 is connected through R5 in series with R6 to ground. The junction between R5 and R6 is connected to the noninverting input of OA2. The inverting input of OA2 is connected to ground. The output of OA2 is connected through a pull up resistor, R8, to +V. The output of OA2 is also connected to the input of I2.

As will be readily appreciated by those skilled in the art from the foregoing description and viewing the embodiment of the demodulator switching generator 35 illustrated in FIG. 3, the outputs of I1 and I2 are square wave signals having the same frequency as the frequency of the signal applied to the transmit coil 51 housed in the detector head 31. In addition, the square waves are phase related by a predetermined amount dependent upon the value of the chosen components. However, this amount is not ninety degrees (90°). More specifically, while as noted above, the $V_X$ and $V_R$ demodulators demodulate on a quadrature basis, because of internal phase shifts produced in the $V_X$ and $V_R$ demodulators, the phase relationship between the square waves produced at the outputs of I1 and I2 is not exactly ninety degrees (90°). Rather, the square wave phase relationship is offset from 90 degrees by an amount adequate to compensate for the internal phase shifts that occur in the $V_X$ and $V_R$ demodulators, which are more fully described below.

The phase shift preamplifier 37 comprises: four capacitors designated C4, C5, C6 and C7; three resistors designated R9, R10 and R11; a potentiometer designated P1; and, an operational amplifier designated OA3. The ungrounded end of the receive coil 53 of the detector head 31 is connected through C4 to ground and to the noninverting input of OA3. The inverting input of OA3 is connected through R9 in series with C5 to ground. R10 and C6 are connected in parallel and between the output of OA3 and the inverting input of OA3. The output of OA3 is connected through P1 in series with R11 and C7 to ground. The movable element of P1 is connected to the output of OA3. The output of the phase shift preamplifier, which is applied to the $V_X$ and $V_R$ demodulators in the manner hereinafter described, is produced at the junction between R11 and C7. As its name implies, the phase shift preamplifier phase shifts the output of the receive coil. The magnitude of phase shift is controlled by adjusting P1. Once set P1 remains fixed, whereby the phase shift produced by the phase shift preamplifier remains set at a fixed value.

The $V_X$ and $V_R$ demodulators 39 and 41 are identical in form. The $V_X$ demodulator 39 comprises: two capacitors designated C8 and C9; four resistors designated R12, R13, R14 and R15; an inverter designated I3; two insulated gate field effect transistors switches designated FET1 and FET2; and, an operational amplifier designated OA4. FET1, FET2 and the other hereinafter described insulated gate field effect transistor switches are N-channel type switches. Such switches may take on various forms. The preferred form is CMOS integrated circuit form wherein a plurality of switches are contained in a single integrated circuit. Each switch may comprise a separate P-channel device and an N-channel device connected together to operate as an N-channel composite device.

The output of the phase shift preamplifier, i.e., the signal at the junction of R11 and C7, is connected through C8 to one end of each of R12 and R13. C9 is connected across the other ends of R12 and R13. The junction between R12 and C9 is connected to the source terminal of FET1. The drain terminal of FET1 is connected to ground. The junction between R13 and C9 is connected to the source terminal of FET2 and the drain terminal of FET2 is connected to ground. The output of I1 of the demodulator switching generator 35 is connected to the gate terminal of FET1 and through I3 to the gate terminal of FET2. The junction between R12 and C9 is also connected through R14 to the inverting input of OA4. The junction between R13 and C9 is also connected to the noninverting terminal of OA4. R15 is connected between the output of OA4 and the inverting input of OA4. The output of OA4 is the signal previously designated $V_X$.

As noted above, the $V_R$ demodulator is formed in a manner identical to the $V_X$ demodulator. More specifically, the $V_R$ demodulator comprises: two capacitors designated C10 and C11; four resistors designated R16, R17, R18 and R19; an inverter designated I4; two insulated gate field effect transistor switches designated FET3 and FET4; and, an operational amplifier designated OA5. The output of the phase shift preamplifier is connected through C10 to one end of each of R16 and R17. C11 is connected across the other ends of R16 and R17. Further, the junction between R16 and C11 is connected to the source terminal of FET3 and the drain terminal of FET3 is connected to ground. The junction between C11 and R17 is connected to the source terminal of FET4 and the drain terminal of FET4 is connected to ground. The output of I2 of the demodulating switching generator is connected to the gate terminal of FET3 and through I4 to the gate terminal of FET4. The junction between R16 and C11 is also connected through R18 to the inverting input of OA5. The junction between R17 and C11 is also connected to the noninverting input of OA5. R19 is connected between the output of OA5 and the inverting input of OA5. The output of OA5 is the signal previously designated $V_R$.

The $V_X$ and $V_R$ demodulators are quadrature demodulators that demodulate the output of the phase shift preamplifier. More specifically, as previously described, the demodulation switching generator produces two phase separated square wave signals. While phase separated, both square waves are at the same frequency as the output of the phase shift preamplifier since the frequency of the phase shift amplifier output is based on a signal produced by the transmit coil, which is driven at the same frequency as the demodulator switching generator. As noted above, the phase separation between the two square waves produced by the demodulator switching generator is such that phase shifts produced by the resistive and capacitive input components of the $V_X$ and $V_R$ demodulators results in a ninety degree (90°) or quadrature demodulation of the output of the phase shift preamplifier. As a result, the outputs of the $V_X$ and $V_R$ demodulators are quadrature related.

In addition to the just described quadrature relationship, one other relationship exists. Specifically, the $V_R$ demodulator is centered at the zero crossing point of the signal at the junction of C10, R16 and R17 produced when the detector head is moved over mineralized ground. More specifically, when the detector head is moved over mineralized ground, the coupling provided by the ground creates a sinusoidal signal at the frequency of the F1 signal, which is the same as the frequency of the square waves produced by the demodulator switching generator. The phase shift produced by the phase shift circuit 37 is set such that the zero crossing points of the phase shifted signal (ignoring any DC offset) occurring at the junction between C10, R16 and R17 are centered at the center of the square waves of the demodulator signal. In other words the phase relationship between the signal produced by mineralized ground and the demodulation signal that drives the $V_R$ demodulator 41 is ninety degrees (90°). As a result of this arrangement the $V_R$ signal is a relatively "clean" signal, i.e., substantially all of the ground information picked up by the receive coil is removed by the $V_R$ demodulator. This result occurs because the centering of the demodulation signal causes ground information to be cancelled from the demodulated signal as the FET switches are alternately switched on and off to control the charge on C11. The net result is that the output of OA5 is substantially zero when the only disrupting object is mineralized ground. Contrariwise, an object such as coin, pull tab, etc. adds a signal that appears to create a phase shift at the junction of C10, R16 and R17, resulting in the production of a voltage on C11. Thus, a $V_R$ signal of the type illustrated in FIG. 7 occurs on the output of the $V_R$ demodulator when the detector head is moved over mineralized ground that contains a metal target.

In contrast to the operation of the $V_R$ demodulator, the $V_X$ demodulator does produce an output signal when the detector head passes over mineralized ground (see FIG. 8, line C). This result occurs because the $V_X$ demodulator is not centered at the zero crossing points of the signal at the junction of C8, R12 and R13. Rather, as noted above, the $V_X$ demodulator is phased ninety degrees (90°) from this point. As a result, the ground creates a voltage charge on C9, whereby mineralized ground causes the $V_X$ demodulator to produce an output ($V_X$) signal. When the mineralized ground contains a metallic object, the metal object adds a signal that appears to create a phase shift at the junction of C8, R12 and R13, resulting in a variation in the voltage on C9. The polarity of the variation depends upon whether the metallic object is ferrous or nonferrous (see FIG. 8, lines A and B). Consequently, when an object is located in mineralized ground the $V_X$ signal contains a ground component and a target component (the combination of FIG. 8, lines A and C or FIG. 8, lines B and C). In contrast, the $V_R$ signal contains substantially no ground component. Rather it only contains substantially only a target component.

As will be readily appreciated by those familiar with prior art metal detectors, the circuits suitable for performing the functions of the circuits illustrated in FIG. 3 have been used before to produce "dirty" $V_X$ and "clean" $V_R$ signals. Thus, the functional operation of the circuitry described thus far is not deemed to be novel per se. The circuitry has been included because it is required to produce one form of a metal detector system in accordance with the invention that has target and mineralized ground discrimination capabilities; and, because it is believed that an understanding of how the $V_R$ and $V_X$ signals are developed will assist in an understanding of the novel aspects of the invention. Attention is directed to U.S. Pat. No. 4,128,803 referenced above for a description of a subsystem that functions in the same general manner as the subsystem illustrated in FIG. 3 to produce similar types of $V_R$ and $V_X$ signals.

FIG. 4 is a schematic diagram of: a $V_{GB}$ amplifier 43; a $V_{GB}$ filter 45; a $V_D$ amplifier 47; and, a $V_D$ filter 49 suitable for use in the signal production subsystem illustrated in FIG. 1. The $V_{GB}$ amplifier 43 comprises: five resistors designated R20, R21, R22, R23 and R24; a potentiometer designated P2; a capacitor designated C12; and, an operational amplifier designated OA6. The output of the $V_X$ demodulator is connected through R20 in series with R21 to the output of the $V_R$ demodulator. The output of the $V_X$ demodulator is also connected through R22 in series with P2 to ground. R23 is connected in parallel with P2. The adjustable terminal of P2 is connected to the noninverting input of OA6. The junction between R20 and R21 is connected to the inverting input of OA6. C12 and R24 are connected in parallel between the output of OA6 and the inverting input of OA6.

As will be readily appreciated by those skilled in the operational amplifier art, the $V_{GB}$ amplifier is, in effect, a differential amplifier that amplifies an adjustable difference between the $V_X$ and $V_R$ signals. Because of the adjustable nature of the amplifier, the effect of mineralized ground can be deleted. More specifically, PT2 is a ground balance potentiometer that allows the effect of mineralized ground to be entirely deleted from the differential signal. In this regard, as noted above, the $V_X$ signal contains some ground information and the $V_R$ signal contains very little ground information, if any. A combination of these two signals, created at the junction of R20 and R21, is applied to the inverting input of OA6. An adjustable magnitude $V_X$ signal is applied to the noninverting input of OA6; and OA6 is differentially combines its inverting and noninverting input. When PT2 is set appropriately, the output of OA6 has a substantially zero ground mineralization component. As a result, when the detector head is passed over mineralized ground containing no metal target, the output of the $V_{GB}$ amplifier, denoted the $V_{GB}$ signal, is zero. When the detector head passes over a target, a $V_{GB}$ signal pulse is created (see FIG. 9, line A). The magnitude and duration of the pulse is dependent on how close the target is to the detector head (magnitude) and how long the detector head is over the target (duration).

The $V_{GB}$ filter 45 comprises: five capacitors designated C13, C14, C15, C16 and C17; five resistors designated R25, R26, R27, R28 and R29; and, three operational amplifiers designated OA7, OA8, OA9. The output of the $V_{GB}$ amplifier 43, i.e., the $V_{GB}$ signal, is applied through C13 to the noninverting input of OA7. The noninverting input of OA7 is also connected through R25 to ground. The output of OA7 is connected to the inverting input of OA7. The output of OA7 is also connected through C14 in series with R26 to the inverting input of OA8. The noninverting input of OA8 is connected to ground. C15 and R27 are connected in parallel between the output of OA8 and the inverting input of OA8. The output of OA8 is connected through R28 in series with C16 to the inverting input of OA9. The noninverting input of OA9 is connected to ground. The output of OA9 is connected: through C17 to the junction between R28 and C16; and, through R29 to the inverting input of OA9.

As will readily be appreciated by those familiar with operational amplifier type filter ciruits, the $V_{GB}$ filter 45, in essence, comprises three filters—two highpass filters and one bandpass filter. The first highpass filter is formed by C13, R25 and OA7. The second highpass filter is formed by C14, C15, R26, R27 and OA8; and, the bandpass filter is formed by the remaining components, i.e., R28, R29, C16 C17 and OA9. All of the filters have steep low frequency roll-off characteristics. The target created $V_{GB}$ signals are converted from pulse signal form into ringing signal form by the $V_{GB}$ filter. (A ringing signal is a sinusoidal burst signal that decays to zero.) The conversion is such that both the $V_{GB1}$ signal, which occurs at the output of the second highpass filter, i.e., at the output of OA8, and the $V_{GB2}$ signal, which occurs at the output of the bandpass filter, i.e., at the output of OA9, are ringing signals. However, $V_{GB1}$ is only a partial ringing signal, namely a three sinusoidal pulse signal (see FIG. 9, line C) while $V_{GB2}$ is a full ringing signal (see FIG. 9, line D). $V_{GB1}$ and $V_{GB2}$, as well as $V_{GB}$, are applied to the signal processor.

The $V_D$ amplifier 47 comprises: three resistors designated R30, R31 and R34; a potentiometer designated P3; and, an operational amplifier designated OA10. The output of the $V_X$ demodulator is connected through R31 in series with R30 to the output of the $V_R$ demodulator. The output of the $V_R$ demodulator is also connected through P3 to ground. R33 is connected in parallel with P3. The adjustable terminal of P3 is connected to the noninverting input of OA10. The junction between R30 and R31 is connected to the inverting input of OA10. R34 is connected between the output of OA10 and the inverting input of OA10.

As will be readily appreciated by those skilled in the operational amplifier art, the $V_D$ amplifier, like the $V_{GB}$ amplifier is, in effect, a differential amplifier that amplifies an adjustable difference between the $V_X$ and $V_R$ signals. However, contrary to the $V_{GB}$ amplifier, the adjustment is such that the effect of mineralized ground is not deleted. Rather, P3, which forms a discriminate potentiometer, is adjustable such that the target component of the output of the $V_D$ amplifier is positive or negative in accordance with whether or not the target creating that pulse is a target that is being discriminated against or one that is not being discriminated against. While the adjustment can be based on a ferrous/nonferrous basis, it also can be based on rejecting or discriminating against some nonferrous objects as well as ferrous objects. In this regard it should be noted that the $V_D$ amplifier is inverting for its $V_X$ input. Also, the sensitivity to its $V_R$ input is continuously adjustable by P3 so as to be of opposite polarity at the two extremes of the adjustment range. Regardless of how set, a combination of the $V_R$ and $V_X$ signals, created at the junction of R30 and R31, is applied to the inverting input of OA10. An adjustable $V_R$ signal is applied to the noninverting input of OA10; and, OA10 differentially combines its inverting and noninverting input. It is the portion of the $V_R$ signal applied to the noninverting input of OA10 as determined by the setting of P3 that controls the proportion of the target component of the $V_R$ signal that is combined with the target component of the $V_X$ signal. And it is the proportion of the $V_R$ signal that determines when the target component of the output of the $V_D$ amplifier shifts from a negative polarity to a positive polarity. More specifically, ferrous components create a positive target component in the output of the $V_D$ amplifier. Some nonferrous components will also create a positive output if P3 is set such that the $V_D$ amplifier is noninverting for its $V_R$ input. As a result, the polarity of the target component produced at the output of the $V_D$ amplifier will "appear" polarity-wise as though the target is ferrous even though it is actually nonferrous.

The $V_D$ filter 49 comprises: six capacitors designated C19, C20, C21, C22, C23 and C24; six resistors designated R35, R36, R37, R38, R39 and R40; and, three operational amplifiers designated OA11, OA12 and OA13. The output of the $V_D$ amplifier 47, i.e., the $V_D$ signal is applied through C19 to the noninverting input of OA11. The noninverting input of OA11 is also connected through R35 to ground. The output of OA11 is connected to the inverting input of OA11. The output of OA11 is also connected through C20 in series with R36 to the inverting input of OA12. The noninverting input of OA12 is connected to ground. C21 and R37 are connected in parallel between the output of OA12 and the inverting input of OA12. The output of OA12 is connected through R38 in series with C22 to the inverting input of OA13. The noninverting input of OA13 is connected to ground. The output of OA13 is connected: through C23 to the junction between R38 and C22; and, through R39 to the inverting input of OA13. The output of OA13 is also connected through C24 in series with R40 to ground. $V_{D2}$ occurs at the junction between C24 and R40.

As with the $V_{GB}$ filter 45, the $V_D$ filter 49, in essence, comprises three filters—two highpass filters and one bandpass filter. The first highpass filter is formed by C19, R35 and OA11. The second highpass filter is formed by C20, C21, R36, R37 and OA12; and, the bandpass filter is formed by R38, R39, C22, C23 and OA13. C24 is a coupling capacitor and in combination with R40 forms a highpass filter.

All of the filters have steep low frequency roll-off characteristics. These filters function to remove a substantial portion of the ground mineralization component of the $V_D$ signal. In addition, the target component of the $V_D$ signal is converted from pulse signal form into ringing signal form by the $V_D$ filter. The conversion is such that $V_{D2}$ is in the form of a full ringing signal, somewhat similar to $V_{GB2}$. In addition, the $V_{D2}$ ringing signal is phase correlated with the $V_{GB2}$ ringing signal created by a target. As used here phase correlation means that these signals are either in phase or 180 degrees out of phase depending upon the polarity of the target component of the $V_D$ signal. The actual phase relationship between the $V_{GB2}$ and $V_{D2}$ ringing signals depends upon the polarity of the $V_D$ pulse signal. If the pulse is of one polarity the $V_{GB2}$ and $V_{D2}$ ringing signals are in phase. If the pulse is of the opposite polarity the $V_{GB2}$ and $V_{D2}$ signals are 180 degrees out of phase. Since the polarity of the $V_D$ pulse signal relates to whether the target is or is not of the type being discriminated against, the phase relationship between the $V_{GB2}$ and $V_{D2}$ ringing signals contains the same information.

A preferred embodiment of a signal processor suitable for receiving the signals produced by the signal production system illustrated in FIG. 1 and producing an output signal that discriminates between desirable and undesirable targets is illustrated in FIG. 2. The signal processor illustrated in FIG. 2 comprises: an inverter 71; an R window circuit 73; a rectifier 75; a triangle modulator 77; an enable circuit 79; a divider 81; a signal ratio discrimination circuit 83; a mode control circuit 85; a track and hold circuit 87; an audio circuit 89; and, a speaker 91. The F2 signal is aplied to the inverter 71, the triangle modulator 77 and the audio circuit 89. The output of the inverter is also applied to the triangle modulator. In essence, the F2 signal is a clock signal that is used by the triangle modulator to produce a triangular signal whose magnitude tracks the envelope of the $V_{GB2}$ signal, as described below. The F2 signal is modulated by the audio circuit 89 in the manner hereinafter described to produce an audible signal.

The $V_{GB2}$ signal is applied to the R window circuit 73 and to the rectifier 75. The R window circuit produces a two state R WINDOW signal that shifts from a first state to a second state and remains (except for short excursions hereinafter described) in the second state during the period of time a $V_{GB2}$ ringing signal of a predetermined magnitude occurs on the output of the $V_{GB}$ filter. In addition, the R window circuit produces a pair of anti-phase squarewave signals denoted +R and −R, having the same frequency as the frequency of the $V_{GB2}$ ringing signals. The +R and −R signals are applied to the rectifier 75 and to the divider 81.

The rectifier 75 produces three signals, denoted +RR, −RR and REFERENCE RR. The +RR and −RR signals are positive and negative fully rectified versions of the $V_{GB}$ ringing signal. The REFERENCE RR signal is a reference level signal that, in essence, lies exactly between the magnitudes of the +RR and −RR signals. The +RR, −RR and REFERENCE RR signals are all applied to the signal ratio discrimination circuit 83. Further, the +RR and −RR signals are applied to the triangle modulator 77.

Enable circuit 79 receives the $V_{GB1}$ signal and, produces an ENABLE signal. The ENABLE signal shifts from a first state to a second state and remains in the second state during the period of time a $V_{GB1}$ partially ringing signal occurs on the output of the second highpass filter of the $V_{GB}$ filter, as previously described. The ENABLE signal is applied to the signal ratio discrimination circuit 83.

The divider 81, in essence, divides the $V_{D2}$ signal by the $V_{GB2}$ signal. More specifically, the $V_{GB2}$ signal is converted by the rectifier and the triangle modulator into a triangular wave signal having a magnitude that tracks the envelope of the $V_{GB2}$ signal. The triangular wave signal is applied to the divider 81. The $V_{D2}$ signal is received in ringing signal form. The R WINDOW signal enables the divider 81 during the period of time that a $V_{GB2}$ ringing signal of sufficient magnitude is present on the output of the $V_{GB}$ filter. In accordance with these input signals the divider produces output pulses on one or the other of two output lines denoted ferrous and nonferrus. The width of these pulses is related to the ratio between the $V_{D2}$ ringing signal and the $V_{GB2}$ ringing signal. Thus, the divider divides the $V_{D2}$ ringing signal by the $V_{GB2}$ ringing signal. The pulses are produced on an output denoted FERROUS when the target is of a type being discriminated against. As noted above, this may include some nonferrous targets as well as ferrous targets. Thus, the notation of the output as FERROUS is to be taken as descriptive, rather than limiting. When the target is of the type not being discriminated against, pulses are produced on an output of the divider 81 denoted NONFERROUS. As will be better understood from the following description, even though the target is of a type that produces a large number of pulses on the appropriate FERROUS or NONFERROUS output, a few pulses occur on the other output due to the limitations of realizable circuits.

The signal ratio discrimination circuit 83 integrates the pulses produced by the divider 81 and produces a positive or negative output signal that tracks the +RR or −RR envelope depending upon whether or not the pulses occur on the FERROUS or NONFERROUS output of the divider. The output of the signal ratio discrimination circuit 83 is applied to the audio circuit 89 and modulates the F2 pulses applied to the audio circuit to control the magnitude of the signal applied to the speaker 91 and, thus, the magnitude of the audible output of the speaker.

The mode control circuit 85 produces a bi-stable MODE signal that is applied to the track and hold circuit 87 and the signal ratio discrimination circuit 83. The $V_{GB}$ signal is also applied to the track and hold circuit 87. The output of the track and hold circuit is applied to the audio circuit 89. Depending upon the state of the MODE signal, either the $V_{GB}$ signal (via the track and hold circuit) or the output of the signal ratio discrimination circuit 83 controls the output of the audio circuit 89 and, thus, the audible signal produced by the speaker 91. As a result, a metal detector system formed in accordance with the invention can be placed in a $V_{GB}$ mode of operation wherein any target, regardless of its ferrous/nonferrous nature will cause an increase in the output of the audio circuit. Thereafter, the user can shift to a $V_D$ mode of operation wherein a subsequent pass over the target will cause the output of the audio circuit to change in a manner that depends on whether or not the target is or is not of the type being discriminated against. Preferably, targets not being discriminated against will cause an increase in the output of the audio circuit 89 and targets being discriminated against will cause a decrease in the output of the audio circuit 89.

Figure 5:
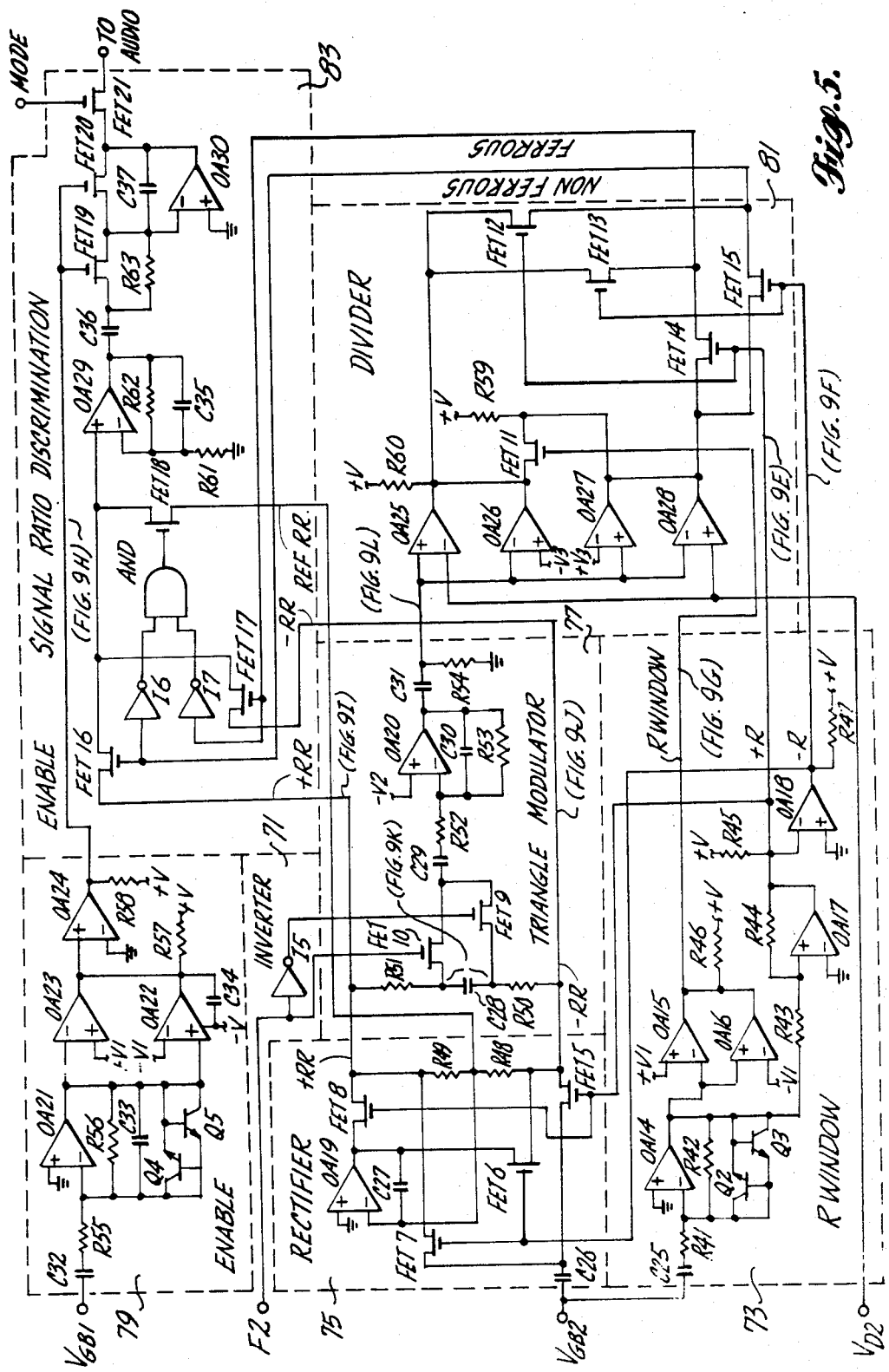
FIG. 5 is a schematic diagram of an inverter, an R window circuit, a rectifier, a triangle modulator, an enable circuit, a divider, and a signal ratio discrimination circuit suitable for use in the signal processor illustrated in FIG. 2.

A schematic diagram of preferred embodiments of circuits suitable for use in forming: the inverter 71; the R window circuit 73; the rectifier 75; the triangle modulator 77; the enable circuit 79; the divider 81; and, the signal ratio discrimination circuit 83 of the signal processor are illustrated in FIG. 5 and next described. The inverter 71 comprises a single inverter designated I5. The F2 signal produced by the oscillator and loop driver circuit 33 of the signal production subsystem is applied to the input of I5. The output of I5 is thus the complement of the F2 signal, i.e., an $\overline{F2}$ signal.

The R window circuit 73 comprises: a capacitor designated C25; seven resistors designated R41 through R47; two NPN transistors designated Q2 and Q3; one operational amplifier designated OA14; and, four comparators designated OA15 through OA18. OA15 and OA16 are comparators of the type having an NPN open collector output. Thus, the high output state of these comparators is a state wherein the comparator output is effectively disconnected from external components.

The $V_{GB2}$ signal is applied through C25 in series with R41 to the inverting input of OA14. The noninverting input of OA14 is connected to ground. R42 is connected between the output of OA14 and the inverting input of OA14. The inverting input of OA14 is also connected to the collector and base of Q2 and to the emitter of Q3. The collector and base of Q3 and the emitter of Q2 are connected to the output of OA14. The output of OA14 is also connected to the inverting input of OA15 and to the noninverting input of OA16. The noninverting input of OA15 is connected to a positive reference voltage designated +V1 and the inverting input of OA16 is connected to a negative reference voltage designated −V1. The outputs of OA15 and OA16 are connected together and through a pull up resistor, R46, to +V. The R WINDOW signal is formed at the outputs of OA15 and OA16.

The output of OA14 is also connected through R43 to the noninverting input of OA17. The inverting input of OA17 is connected to ground. R44 is connected between the output of OA17 and the noninverting input of OA17. The output of OA17 is also connected through a pull up resistor, R45, to +V. Further, the output of OA17 is connected to the inverting input of OA18. The noninverting input of OA18 is connected to ground. The output of OA18 is connected through a pull up resistor, R47, to +V. The +R signal is formed on the output of OA17 and the −R signal is formed on the output of OA18.

As will be readily appreciated from the foregoing description, OA14 and the circuit components related thereto, i.e., C25, R41, R42, Q2 and Q3 form a limiter amplifier that produces a high pass filtered, limited version of the $V_{GB2}$ signal. Filtering is provided by C25 and R41; and limiting is provided by Q2 and Q3. OA15 and OA16 form a pair of comparators that are triggered at relatively low levels. In this regard, in one actual embodiment of the invention, +V1 and −V1 were chosen to be + and −0.2 volts, respectively. This magnitude was well below the clamping level created by Q2 and Q3. Thus, the outputs of the appropriate one of OA15 and OA16 switched well before the output of OA14 was clamped by the appropriate one of Q2 and Q3. In essence, OA15 and OA16 rectify and logically combine the output of OA14, when the absolute magnitude of the output of OA14 is above the absolute magnitude of ±V1. Rectification occurs because OA15 inverts input signals above the switching level set by +V1 and OA16 does not invert signals above the switching level set by −V1. While rectification occurs, short periods of time elapse during which neither the OA15 or the OA16 outputs switch states. These periods occur when the output of OA14 passes through zero. Thus, the R WINDOW signal includes a plurality of short excursions, one related to each zero crossing of the output of OA14. More specifically, the output of OA15 and OA16, i.e., the R WINDOW signal, is normally high. When the first excursion of a $V_{GB2}$ ringing signal occurs, the R WINDOW signal goes low and remains there for the majority of the excursion. When the excursion ends and the zero crossing point is approached, the triggered one of OA15 and OA16 returns to its nontriggered output state, whereby the R WINDOW signal returns to its high state. The R WINDOW signal remains in its high state until the next excursion (which occurs in the opposite polarity direction) triggers the other one of OA15 and OA16. When this point is reached the R WINDOW signal returns to its low state and remains there until the next zero crossing occurs. The end result is an R WINDOW signal of the type described above, which is illustrated in FIG. 9, line G. The R WINDOW signal exists only for the period of time that $V_{GB2}$, or more precisely, the output of OA14, rises above $+V1$ or drops below $-V1$. Preferably the magnitude of $\pm V1$ is chosen to be slightly above the magnitude of system noise signals. As a result, system noise is insufficient to trigger OA15 or OA16.

OA17 and OA18 form a second pair of comparators. The first comparator, OA17, receives the limited output of OA14 via R43. A slight amount of positive feedback provided by R44 creates circuit hysteresis that squares up the output of OA14. OA18 inverts the output of OA17 whereby the $-R$ signal (FIG. 9, line F), which occurs on the output of OA18, is the complement of the $+R$ signal (FIG. 9, line E), which occurs on the output of OA17. That is, the $+R$ and $-R$ signals are 180 degrees out of phase. While the OA15 and OA16 comparators require a particular signal level in order to trigger or toggle, i.e., switch output states, the OA17 and OA18 comparators, because they are referenced to ground, have no such requirement. Consequently, the $+R$ and $-R$ signals continuously switch states even in the absence of a $V_{GB2}$ ringing signal. Such noise switching is of no consequence since the divider is disabled in the absence of an R WINDOW signal, which only occurs when a $V_{GB2}$ ringing signal of adequate magnitude occurs, as previously described.

The rectifier 75 comprises: two capacitors designated C26 and C27; two resistors designated R48 and R49; an operational amplifier designated OA19; and, four insulated gate field effect transistor switches designated FET5, FET6, FET7 and FET8. The $V_{GB2}$ signal is applied through C26 to the source terminals of FET5 and FET7. The drain terminal of FET5 is connected to the drain terminal of FET6 and through R48 in series with R49 to the drain terminals of FET7 and FET8. The source terminals of FET6 and FET8 are connected to the output of OA19. The junction between R48 and R49 is connected to the inverting input of OA19. The noninverting input of OA19 is connected to ground. C27 is connected between the output of OA19 and the inverting input of OA19. The $+R$ signal produced by the R window circuit is applied to the gate terminals of FET5 and FET8. The $-R$ signal produced by the R window circuit is applied to the gate terminals of FET6 and FET7. The $-RR$ output of the rectifier 75 occurs at the junction between the drain terinals of FET5 and FET6 and R48. The $+RR$ output of the rectifier 75 occurs at the junction between the drain terminals of FET7 and FET8 and R49. The REFERENCE RR output of the rectifier 75 occurs at the junction of R48 and R49.

Figure 9:
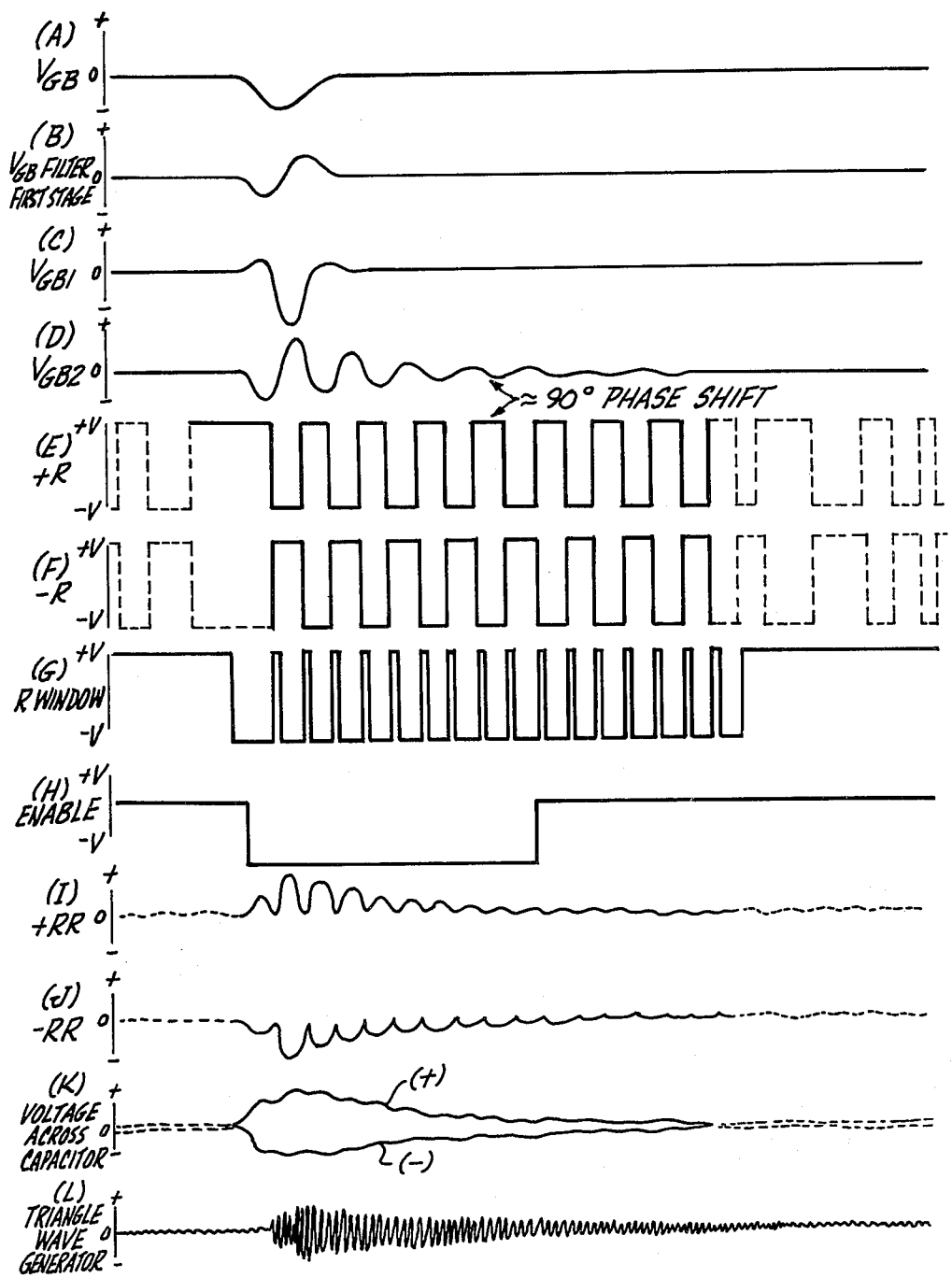
FIG. 9, lines A-L is a series of twelve waveforms illustrating the signals formed at various points in the signal production subsystem and in the signal processor.

As will be readily appreciated from the foregoing description and viewing FIG. 5, the rectifier circuit 75 includes a filter formed by C26 in combination with R48 or R49. The time constant of this filter is the same as the time constant of the filter of the R window circuit (i.e., the filter formed by C25 and R41). Thus, the $+R$ and $-R$ signals switch their respective FET switches in phase with the $V_{GB2}$ signal. As a result, $-RR$ and $+RR$ are rectified decaying sine waves (because $V_{GB2}$ is a decaying sine wave) of opposite polarity. More specifically, a tracing of the rectifier circuit reveals that the FET switches are switched in a manner that causes the filtered $V_{GB2}$ signal to be rectified in a full wave manner in both the positive and negative directions. Positive pulses form the $+RR$ signal (FIG. 9, line I) and negative pulses form the $-RR$ signal (FIG. 9, line J).

The triangle modulator 77 comprises: four capacitors designated C28, C29, C30 and C31; five resistors designated R50, R51, R52, R53 and R54; an operational amplifier designated OA20; and, two insulated gate field effect transistor switches designated FET9 and FET10. The $-RR$ signal produced by the rectifier 75 is applied through R50 to one side of C28 and the $+RR$ signal is applied through R51 to the other side of C28. The junction between R50 and C28 is connected to the source terminal of FET9 and the junction between C28 and R51 is connected to the source terminal of FET10. The drain terminals of FET9 and FET10 are connected together and through C29 in series with R52 to the inverting input of OA20. The F2 signal is applied to the gate of FET10 and the output of I5, i.e., the $\overline{F2}$ signal, is applied to the gate of FET9. The noninverting input of OA20 is connected to a negative voltage source designated $-V2$. C30 and R53 are connected in parallel, between the output of OA20 and the inverting input of OA20. The output of OA20 is connected through C31 in series with R54 to ground. The output of the triangle modulator applied to the divider occurs at the junction between C31 and R54.

R50 in combination with C28 form a filter for the $-RR$ signal and C28 in combination with R51 form a filter for the $+RR$ signal. The filters remove the harmonics from the rectified signals, whereby the voltage across C28 is a relatively smooth envelope of the $V_{GB2}$ signal (see FIG. 9, line K). FET9 and FET10 alternately apply the positive and negative sides of the envelope signal at the frequency of the F2/$\overline{F2}$ signals to an integrator formed by OA20 and its related components, namely R53 and C30. In other words the signal applied to the integrator is a modulated burst signal. Preferably the modulation frequency, i.e., the frequency of the F2/$\overline{F2}$ signals is several hundred times the frequency of the $V_{GB2}$ ringing signal. Further, the integrator formed by OA20, R53 and C30 has a relatively long time constant compared to the period of F2, i.e., the resistance of R53 is high when compared to the reactance of C30. As a result, the integrator converts the pulses of the modulated envelope signal into triangular waves. C31 removes any DC offset component produced by OA20. The end result is a triangular wave signal having an evelope that tracks the envelope of the $V_{GB2}$ ringing signal, not the individual pulses of the $V_{GB2}$ ringing signal (see FIG. 9, line L). This signal is applied to the divider, as noted above.

The enable circuit 79 comprises: three capacitors designated C32, C33 and C34; four resistors designated R55, R56, R57 and R58; two NPN transistors designated Q4 and Q5; one operational amplifier designated OA21; and, three comparators designated OA22, OA23 and OA24. OA22 and OA23 are comparators of the type having an NPN open collector output. The $V_{GB1}$ signal is applied through C32 in series with R55 to the inverting input of OA21. The noninverting input of OA21 is connected to ground. C33 and R56 are connected in parallel, between the output of OA21 and the inverting input of OA21. The inverting input of OA21 is also connected to the base and collector of Q4 and to the emitter of Q5. The output of OA21 is also connected to the base and collector of Q5 and to the emitter of Q4. Finally, the output of OA21 is connected to the noninverting input of OA22 and to the inverting input of OA23. The inverting input of OA22 is connected to −V1 and the noninverting input of OA23 is connected to +V1. The outputs of OA22 and OA23 are connected together and to the noninverting input of OA24. The outputs of OA22 and OA23 are also connected through a pull up resistor, R57, to +V. A capacitor, C34, is connected between the outputs of OA22 and OA23 and the negative (−V) power inputs thereof. The inverting input of OA24 is connected to ground. The output of OA24 is connected through a pull up resistor, R58, to +V.

OA21 and its associated components, i.e., C32, C33, R55, R56, Q4 and Q5 form a high gain limited amplifier. The output of the high gain limited amplifier is applied to two comparators formed by OA22 and OA23. The comparator inputs of OA22 and OA23 are set at a relatively low level. For example, −V1 and +V1 may be set at −0.2 volts and +0.2 volts, respectively, i.e., the same values used in the R window circuit. In any event this voltage level is set such that the comparators formed by OA22 and OA23 switch before the clamping effects of Q4 and Q5 become effective. Q4 and Q5 are provided to prevent OA21 from becoming saturated. In other words Q4 and Q5 are provided to maintain the integrity of the output of OA21. As noted above, the $V_{GB1}$ signal produced when the detector head passes over a target is a partial ringing signal, i.e., it is in the form of three sinusoidal pulses. As a result, the outputs of OA22 and OA23 form, in essence, a long pulse signal that shifts from a high state to a low state during the period of time the detector head is over the target. However, rather than including excursions from the low state back to the high state during the period of time that the detector head is over the target (as occurs in the R WINDOW signal), such excursions are prevented by the filtering action of R57 and C34. Thus, the signal applied to the noninverting input of OA24 is a long pulse. Thus, the ENABLE signal, which occurs on the output of OA24, is a signal that is normally high and goes low during the period of time that the detector head is over the target (see FIG. 9, line H).

The divider 81 comprises: four comparators designated OA25, OA26, OA27 and OA28; five insulated gate field effect transistor switches designated FET11, FET12, FET13, FET14 and FET15; and, two resistors designated R59 and R60. All of the comparators, i.e., OA25 through OA28, are of the type having an NPN open collector output. The $V_{D2}$ signal is applied to the inverting input of OA25 and to the noninverting input of OA28. The output of the triangle modulator is applied to: the noninverting input of OA25; the inverting input of OA26; the noninverting input of OA27; and, the inverting input of OA28. The noninverting input of OA26 is connected to a negative reference voltage designated −V3 and the inverting input of OA27 is connected to a positive reference voltge designated +V3. +V3 and −V3 are of equal and opposite polarity. In one actual embodiment of the invention, +V3 was chosen to be +3.6 millivolts and −V3 was chosen to be −3.6 millivolts. The outputs of OA25 and OA26 are connected together and to the source terminal of FET11. The outputs of OA25 and OA26 are also connected through a pull up resistor, R60, to +V. The outputs of OA27 and OA28 are connected together and to the drain terminal of FET11. The outputs of OA27 and OA28 are also connected through a pull up resistor, R59, to +V. The R WINDOW signal is applied to the gate terminal of FET11. The outputs of OA25 and OA26 are also connected to the source terminals of FET12 and FET13. Further, the outputs of OA27 and OA28 are connected to the source terminals of FET14 and FET15. The +R signal is applied to the gate terminals of FET12 and FET14 and the −R signal is applied to the gate terminals of FET13 and FET15. The drain terminals of FET12 and FET15 are connected together. The NONFERROUS output of the divider is formed at the junction between FET12 and FET15. Similarly, the drain terminals of FET13 and FET14 are connected together. The FERROUS output of the divider is formed at the junction between FET13 and FET14.

OA25, OA26, OA27 and OA28 form four comparators that, in essence, divide the $V_{D2}$ signal by the $V_{GB2}$. More specifically, OA25, OA26, OA27 and OA28 compare the triangular signal produced by the triangle modulator with either the $V_{D2}$ signal or with −V3 and +V3. Specifically, OA26 and OA27 compare the triangular signal with −V3 and +V3 and create a slight negative window that prevents noise from causing an erroneous reading when the divider is enabled in the manner hereinafter described. OA26 and OA27 also coact with OA25 and OA28 to create a pulse width modulator that modulates the $V_{D2}$ signal in the manner described below. The results of the modulation is a series of pulses on the output of OA25/OA26 or OA27/OA28, depending upon which is operative (which in turn depends upon the polarity of the triangular signal and the $V_{D2}$ signal). Regardless of which one of these comparator pairs produces pulses, the width of the pulses relates to the ratio between $V_{D2}$ and $V_{GB2}$. Thus, $V_{D2}$ is divided by $V_{GB2}$.

Figure 10:
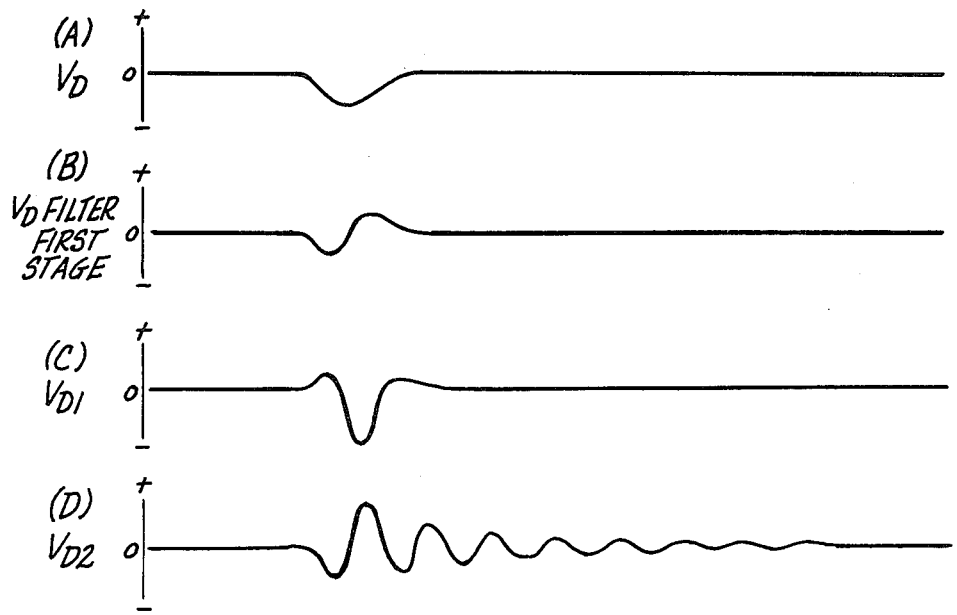
FIG. 10, lines A-D is a series of four waveforms illustrating the form of the target signals created in the $V_D$ channel of the signal production subsystem for a nonferrous target.

As described above and illustrated in FIG. 10D, the target component part of the $V_{D2}$ signal is a ringing (decaying) sine wave. As also noted above, the excursion direction (positive or negative) of the first and, thus, subsequent pulses of the ringing signal is determined by the polarity of the $V_D$ pulse signal created by the detector head passing over a target. The polarity of the first and subsequent excursions of the $V_{D2}$ ringing signal is important because the excursion polarity ultimately determines which one of the two output lines of the divider apply pulses to the signal ratio discrimination circuit 83. If the first excursion is in the positive direction one of the output lines (NONFERROUS or FERROUS) applies pulses to the signal ratio discrimination ciruit during the first excursion and all subsequent excursions of the ringing signal (having a magnitude above the cutoff level set by the magnitude of ±V3, of course). This result occurs because of the phase relationship of the +R and −R signals to the $V_{D2}$ ringing signals produced by the $V_D$ filter when the detector head passes over a metal target. One of these signals (i.e., the +R signal or the −R signal) is in phase with the $V_{D2}$ ringing signal and the other is 180 degrees out of phase with the $V_{D2}$ ringing signal. How this phase relationship functions to create the foregoing result is next described.

The excursion direction of the $V_{D2}$ ringing signal determines which of OA25 or OA28 produces output pulses in response thereto, i.e., the polarity of the excursions determines which comparator amplifier is triggered on and off by the triangular signal produced by the triangle modulator 77. Positive excursions cause OA28 to produce output pulses and negative excursions cause OA25 to produce output pulses. Regardless of which is triggered, the OA25/OA26 and OA27/OA28 comparator pairs produce a modulated version of the $V_{D2}$ ringing signal. FET12, FET13, FET14 and FET15 form a switching network that directs these signals. More specifically, these field effect transistor switches are actuated to direct the modulated ringing signals. They are not actuated to remove the pulse modulation effect produced by the triangular signal. In this regard, it will be recalled that $+R$ and $-R$ signals are square waves that are 180 degrees out of phase with one another. It will also be recalled that these signals have the same frequency as $V_{GB2}$, which is another ringing signal that was created by the detector head passing over a target. As noted above, one significant difference between the $V_{GB2}$ and $V_{D2}$ ringing signals is that the first excursion of the $V_{GB2}$ ringing signal is always in the same direction regardless of whether the target is ferrous or nonferrous. Consequently, $+R$ and $-R$ always have the same phase relationship with respect to the original target pulse. Contrariwise, the polarity of the first excursion of the $V_{D2}$ signal produced when the detector head passes over a metallic target, is dependent upon whether the target is or is not being discriminated against, as described above. While the phase of the $V_{D2}$ ringing signal can be either 0 degrees of 180 degrees with respect to a reference point in time, the various circuit components are chosen such that the frequency of the $V_{D2}$ ringing signal is the same as the frequency of the $V_{GB2}$ ringing signal, and these two signals are phase correlated. Thus, one of the $+R$ and $-R$ signals is in phase with the $V_{D2}$ ringing signal and the other is 180 degrees out of phase therewith.

As a result of the foregoing frequency and phase relationship the FET switches (which are gated open and closed by the $+R$ and $-R$ signals) direct the outputs of OA25/OA26 and OA27/OA28 pairs to either the FERROUS or NONFERROUS outputs of the divider 81 in accordance with whether the target is or is not being discriminated against. This directing function, in essence, combines the outputs of OA25/OA26 and OA27/OA28. (As noted above the outputs of the divider 81 are denoted as FERROUS and NONFERROUS for descriptive purposes only because the discriminate potentiometer of the $V_D$ amplifier can be adjusted such that some nonferrous targets create the same polarity $V_D$ signal pulse as ferrous targets.) The divider is disabled whenever the R window signal applied to the gate of FET11 is high ($V_{GB2}$ is small). This effectively prevents a "divide-by-zero" situation, in which would be inaccurate and meaningless.

Figure 11:
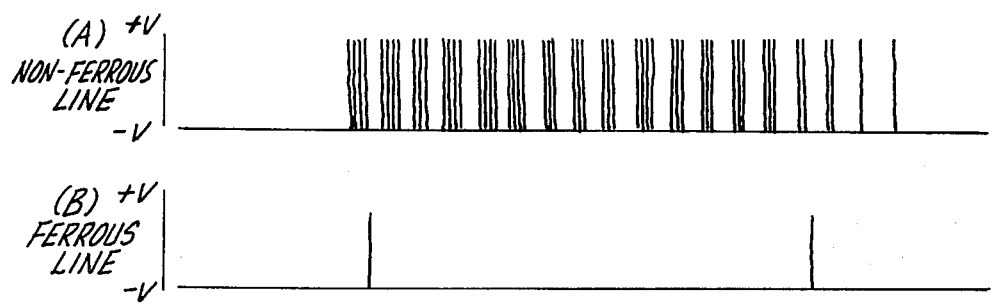
FIG. 11, lines A and B is a series of two waveforms illustrating the types of pulses produced by the divider of the signal processor when the target is of the type not being discriminated against.
Figure 12:
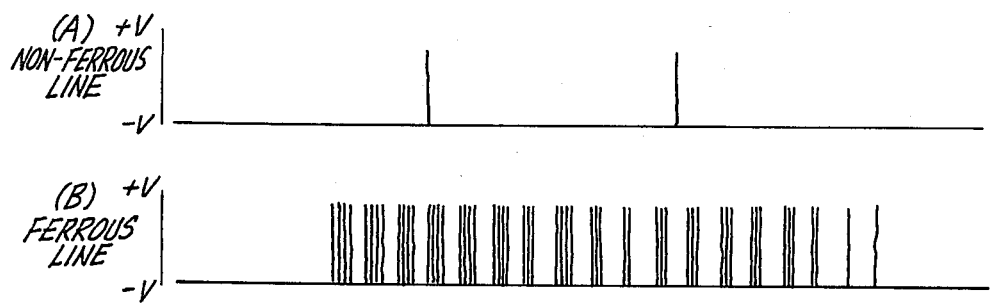
FIG. 12, lines A and B is a series of two waveforms illustrating the type of pulses produced by the divider of the signal processor when the target is of the type being discriminated against; and, FIG. 13 is a block diagram illustrating an alternate embodiment of a signal production subsystem formed in accordance with the invention.

In summary, the divider divides the $V_{D2}$ ringing signal produced by the $V_D$ filter when the detector head passes over a target by the $V_{GB2}$ ringing signal and produces a series of pulse width modulated pulses. The pulses are directed to one of the FERROUS/NONFERROUS outputs in accordance with whether the detected target is or is not being discriminated against. The sign of the quotient, $V_{D2}/V_{GB2}$, determines which of the two outputs pulses are directed to. The absolute value of the quotient determines the width of the pulses. Examples of the pulses produced on the FERROUS and NONFERROUS lines are illustrated in FIG. 11, lines A and B for a nonferrous target and in FIG. 12, lines A and B for a ferrous "type" target.

While the divider 81 could include a single channel, whereby, in essence, a half wave directing action would occur, there is a ground cancellation advantage to the dual channel approach illustrated in FIG. 5 and heretofore described. Specifically, as illustrated in FIG. 11, line B and FIG. 12, line A ground mineralization (and other noise) creates a number of pulses on the FERROUS output of the divider even though the target is nonferrous and vice versa when the divider is enabled as the detector head passes over a target. While not observable in FIGS. 11, line A and 12, line B noise and ground mineralization creates similar pulses on these lines. As a result of the random nature of the noise related pulses, over a period of time, they will create an equal number of pulses on both of the outputs of the divider. Thus, they will have an average effect on the voltage stored in hereinafter described integrator. This result would not be the same in a single channel divider. In such a divider mineralized ground and other noise created pulses would produce an offset error in the output of the integrator. Hence, a dual channel divider circuit of the type illustrated and described reduces the effect of mineralized ground and other noise.

In addition, as will better understood from the following description of the signal ratio descrimination circuit 83 and the audio circuit 89, while a single divider output could be utilized, because only certain types of nonferrous targets are of interest, i.e., not being discriminated against, there is another advantage to having both FERROUS and NONFERROUS outputs. Specifically, the audio output can be set to a predetermined level, which remains constant in the absence of a target. When the detector head passes over a target, the audio output can be controlled so as to increase in amplitude when the detected target is not being discriminated against and decrease in amplitude when the detected target is being discriminated against, as described in more detail below. Thus, the presence of targets being discriminated against will be indicated as well as targets not being discriminated against, albeit in a less pronounced manner. (That is, in most instances of use, the quiescent level of the audio output would be set relatively low whereby it would be more difficult to distinguish a decrease in an amplitude when compared to a similar increase in amplitude.)

The signal ratio discrimination circuit 83 comprises: six insulated gate field effect transistor switches designated FET16, FET17, FET18, FET19, FET20 and FET21; two inverters designated I6 and I7; a two input AND gate designated AND; two operational amplifiers designated OA29 and OA30; three resistors designated R61, R62 and R63; and, three capacitors designated C35, C36 and C37. The $+RR$ signal produced by the rectifier 75 is connected to the source terminal of FET16 and $-RR$ is connected to the drain terminal of FET17. The drain terminal of FET16 and the source terminal of FET17 are connected together and to the source terminal of FET18. The drain terminal of FET18 is connected to the REFERENCE RR output of the rectifier 75. The NONFERROUS output of the divider 81 is connected to the gate terminal of FET16 and to the input of I6. The FERROUS output of the divider 81 is connected to the gate terminal of FET17 and the input of I7. The outputs of I6 and I7 are connected to the two inputs of AND and the output of AND is connected to the gate terminal of FET18.

The junction between the drain terminal of FET16, the source terminal of FET17 and the source terminal of FET18 are connected together and to the noninverting input of OA29. The inverting input of OA29 is connected through R61 to ground. R62 and C35 are connected in parallel between the output of OA29 and the inverting input of OA29. The output of OA29 is also connected through C36 in series with R63 to the inverting input of OA30. The noninverting input of OA30 is connected to ground. C37 is connected between the output of OA30 and the inverting input of OA30. The junction between C36 and R63 is connected to the source terminal of FET19. The drain terminal of FET19 is connected to the source terminal of FET20 and to the junction between R63 and C37. The drain terminal of FET29 is connected to the output of OA30 and to the source terminal of FET21. The drain terminal of FET21 is connected to the audio circuit 89 illustrated in FIG. 6 and hereinafter described.

The ENABLE signal produced by the enable circuit 79 is applied to the gate terminals of FET19 and FET20. The MODE signal produced by the mode control circuit 85 illustrated in FIG. 6 and hereinafter described is applied to the gate terminal of FET21.

FET16, FET17, FET18, I6, I7 and AND form a switching circuit that creates positive or negative pulses (referenced to the voltage on the REFERENCE RR output of the rectifier) on the noninverting input of OA29. More specifically, each time a pulse occurs on the NONFERROUS output of the divider 81 FET16 is gated closed, whereby the voltage on the +RR line is applied to the inverting input of OA29. At the end of the pulse period of time, FET16 is gated open. At the same time FET18 is gated closed via AND. As a result, at the end of a pulse, the voltage on the noninverting input of OA29 is referenced to the REFERENCE RR voltage. As noted above, preferably, this voltage lies exactly inbetween the +RR and −RR voltages. During the period of time pulses are occurring on the NONFERROUS output of the divider, unless pulsed by a noise pulse, the voltage on the FERROUS output is low. As a result, FET17 is gated open and the output of I7 is high. The high output on I7 conditions AND to respond to the high/low changes on the output of I6. Conversely, when pulses occur on the FERROUS output of the divider 81, the voltage on the −RR output of the rectifier is gated through FET17 to the noninverting input of OA29. At the end of each FERROUS pulse, FET18 is gated closed, whereby the REFERENCE RR voltage is applied to the noninverting input of OA29. During this period of time, the NONFERROUS output of the divider 81 is low (except when noise pulses occur), whereby FET16 is gated open and the output of I6 is high. The high output of I6 conditions AND to respond to the high/low changes on the output of I7.

OA29 in combination with R62, C35 and R61 amplifies the pulses produced at the noninverting input of OA29 and filters out large spikes therefrom. C36 couples the output of OA29 to an integrator formed by OA30, R63 and C37. The integrator is controlled by the state of the ENABLE signal produced by the enable circuit 79. In this regard, as illustrated in FIG. 9H and described above, the ENABLE signal is normally high and shifts low during the period of time a $V_{GB1}$ ringing signal occurs. When the ENABLE signal is high FET19 and FET20 are gated closed, whereby the integrator is maintained in a zero state. When the ENABLE signal shifts low, the integrator integrates pulses produced on the output of OA29, which are applied to the integrator via C36. Depending upon the polarity of these pulses, the output of the integrator charges in a positive or negative direction. This output is applied through FET2 to the audio circuit. The positive or negative charging direction of the integrator is, of course, dependent on which one of the FERROUS/NONFERROUS outputs of the divider 81 pulses occur.

To some degree, the output of the integrator tracks the magnitude of the +RR and the −RR signals. In addition, as noted above, noise pulses occurring on the FERROUS/NONFERROUS outputs of the divider are averaged by the integrator.

Figure 6:
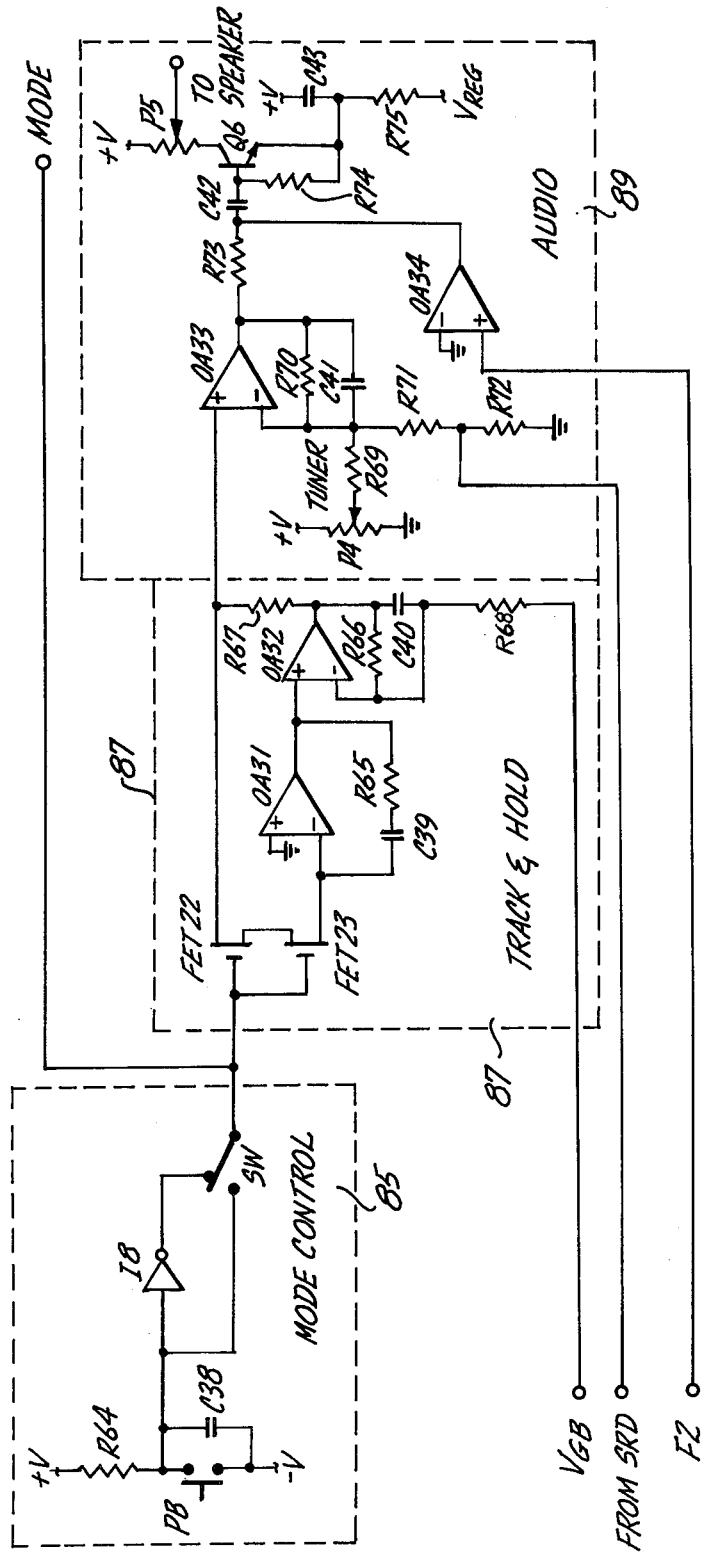
FIG. 6 is a schematic diagram of a mode control circuit, a track and hold circuit and an audio circuit suitable for use in the signal processor illustrated in FIG. 2.

FIG. 6 is a schematic diagram illustrating preferred embodiments of: a mode control circuit 85; a track and hold circuit 87; and, an audio circuit 89, suitable for use in the signal processor illustrated in FIG. 2. The mode control circuit 85 comprises: a pushbutton switch designated PB; a resistor designated R64; a capacitor designated C38; an inverter designated I8; and, a single pole douple throw switch designated SW. R64 is connected in series with the terminals of PB between +V and −V. C38 is connected in parallel with PB. The junction between PB and R64 is connected to the input of I8 and to one of the remote terminals of SW. The output of I8 is connected to the other remote terminal of SW. The MODE signal is produced at the common terminal of SW and, as previously described, is applied to the gate terminal of FET21 of the signal ratio discrimination circuit 83 (FIG. 5). The MODE signal is also applied to the track and hold circuit 87 in the manner hereinafter described.

Except for temporary interruptions, caused by closing PB, the state of SW determines whether the MODE signal is in a high state or a low state. When the common terminal of SW is connected to the output of I8, the MODE signal is in a low state. Contrariwise, when the common terminal of SW is connected to the input of I8, the MODE signal is in a high state. If the pushbutton switch is closed when the MODE signal is in either state, the voltage across C38 is, of course, shorted. As a result, a pulse in the opposite direction occurs, i.e., from low to high or high to low, depending upon the position of SW. This temporary pulse is important with respect to the track and hold circuit 87, because it temporarily zeros the track and hold circuit when the track and hold circuit is functioning to control the operation of the audio circuit 89 in the manner hereinafter described.

The track and hold circuit 87 comprises: two VMOS insulated gate field effect transistor switches designated FET22 and FET23; two operational amplifiers designated OA31 and OA32; two capacitors designated C39 and C40; and, four resistors designated R65, R66, R67 and R68. The common terminal of SW of the mode control 85 is connected to the gate terminals of FET22 and FET23. The drain terminal of FET22 is connected to the drain terminal of FET23 and the source terminal of FET23 is connected to the inverting input of OA31. The noninverting input of OA31 is connected to ground. C39 in series with R65 is connected between the output of OA31 and the inverting input of OA31. The output of OA31 is also connected to the noninverting input of OA32. R66 and C40 are connected in parallel between the output of OA32 and the inverting input of OA32. The output of OA32 is also connected through R67 to the source terminal of FET22; and, to the audio circuit 89. Finally, the inverting input of OA32 is connected through R68 to the output of the $V_{GB}$ amplifier 43 (FIG. 4). Thus, $V_{GB}$ signals created when the detector head passes over a target in the manner previously described are applied through R68 to the inverting input of OA32.

As will be appreciated from the foregoing description, when the MODE signal is high, the output of the signal ratio discrimination circuit is gated to the audio circuit 89. As more fully explained below, the track and hold circuit is zeroed when the MODE signal is high. As a result, $V_{GB}$ pulses are prevented from actuating the audio circuit 89. Contrariwise, when the MODE signal is low, the track and hold circuit amplifies the $V_{GB}$ pulses and applies the amplified signal to the audio circuit 89 so as to control the operation of the audio circuit in the manner hereinafter described. In addition, because the MODE signal is low, the output of the signal ratio discrimination circuit is prevented from controlling the operation of the audio circuit. Consequently, the state of the MODE signal determines whether the $V_{GB}$ pulse signal or the output of the signal ratio discrimination circuit controls the operation of the audio circuit 89.

Zeroing of the track and hold circuit 87 is accomplished when the MODE signal is high because FET22 and FET23 apply the output of OA32 to the inverting input of OA31. OA31 integrates the output of OA32 and applies a compensating signal to the noninverting input of OA32 that drives the output of OA32 to zero. Since the track and hold circuit is conventional, and has been used in the past in metal detectors it will not be further discussed here, except to note that OA31 is an operational amplifier having a high input impedance; C39 is a large capacitor; and, OA32 adds gain to the $V_{GB}$ signal before it is applied through R67 to the audio circuit in the manner hereinafter described. That is, when FET22 and FET23 are gated open, OA32 amplifies the $V_{GB}$ signal and the amplified signal is applied to the audio circuit 89.

The audio circuit 89 comprises: one operational amplifiers designated OA33; one comparator designated OA34; two potentiometers designated P4 and P5; three capacitors designated C41, C42 and C43; seven resistors designated R69–R75; and, a NPN Darlington transistor designated Q6. OA34 is a comparator of the type having an NPN open collector output. The output of the track and hold circuit, i.e., the signal at the junction between R67 and the source terminal of FET22 is applied to the noninverting input of OA33. P4 is connected between +V and ground and the adjustable terminal of P4 is connected through R69 to the inverting input of OA33. R70 and C41 are connected between the output of OA33 and the inverting input of OA33. In addition, the inverting input of OA33 is connected through R71 in series with R72 to ground. The output of the signal ratio discrimination circuit is connected to the junction between R71 and R72. The output of OA33 is connected through R73 in series with C42 to the base of Q6. R74 is connected between the emitter of Q6 and the base of Q6. C43 is connected in series with R75 between +V and a source of regulated voltage denoted $V_{REG}$. The junction between C43 and R75 is connected to the emitter of Q6. The collector of Q6 is connected through P5 to +V. The adjustable terminal of P5 is connected to the speaker 91. F2 is connected to the noninverting input of OA34 and the inverting input of OA34 is connected to ground. The output of OA34 is connected to the junction between R73 and C42.

The adjustment of P4 determines the threshhold level of the output of the amplifier formed by OA33 and its related components. Thus, the adjustment of P4 sets the threshhold of the audible output of the speaker, assuming P5 remains fixed. When the MODE signal is low, whereby the output of the signal ratio discrimination circuit is prevented from being applied to the audio circuit 89, $V_{GB}$ pulse signals, which are amplified by OA32 and its related components control the output of OA33. This signal, in turn, amplitude modulates the audio output of OA34 produced at the junction between R73 and C42. (As noted above, in one exact embodiment of the invention, F2 was chosen to be 412 Hz—a signal in the audio range.) The modulated signals are amplified by Q6, which is a driver (i.e., high beta) transistor, such as a Darlington transistor pair. P5, of course, provides speaker amplitude control. R74 is a bias resistor for Q6, and C43 in combination with R75 provide an audio supply filter. When the MODE signal is high, whereby FET22 and FET23 are closed and the track and hold circuit is maintained in a zero state, the voltage at the noninverting input of OA33 is held at or near ground. As noted above, the high MODE signal also gates FET21 closed, whereby the output of the signal ratio discrimination circuit is applied to the audio circuit 89. The output of the signal ratio discrimination circuit controls the voltage at the junction between R71 and R72, which voltage is amplified by OA33. This amplified signal amplitude modulates the output of OA34 at the junction between R73 and C42 in the same manner as the amplified $V_{GB}$ signal did in the previous description. As a result, as previously noted, the state of the MODE signal controls whether the output of the audio circuit 89 is controlled by the $V_{GB}$ signal or the output of the signal ratio discrimination circuit. The state of the MODE signal is, in turn, controlled by the state of SW of the mode control 85, as described above.

Inclusion of a dual mode of operation allows the user of a metal detector system formed in accordance with the invention to allow $V_{GB}$ signals (which contain substantially no ground mineralization information even when the detector head is moved over mineralized ground) to initially control the audio output produced by the speaker and pinpoint targets. As a result, the target is pinpointed each time the detector head passes over a target, regardless of the nature of the target. Thereafter, the user can change to the discriminate mode of operation and make a subsequent pass over the target. In the discriminate mode of operation desirable targets, i.e., those not being discriminated against, will cause the audio output of the speaker to increase whereas undesirable targets, i.e., those being discriminated against, will cause the audio output to decrease in magnitude. In this way, the user will be informed as to whether the target is a desirable or undesirable target. Obviously this two step sequence of operation can be reversed. As will be readily understood a single step (discriminate only) procedure cannot be used since it is difficult if not impossible to pinpoint a target during the discriminate mode of operation because the detector head must be moved during this mode to create the previously described ringing signals.

Figure 13:
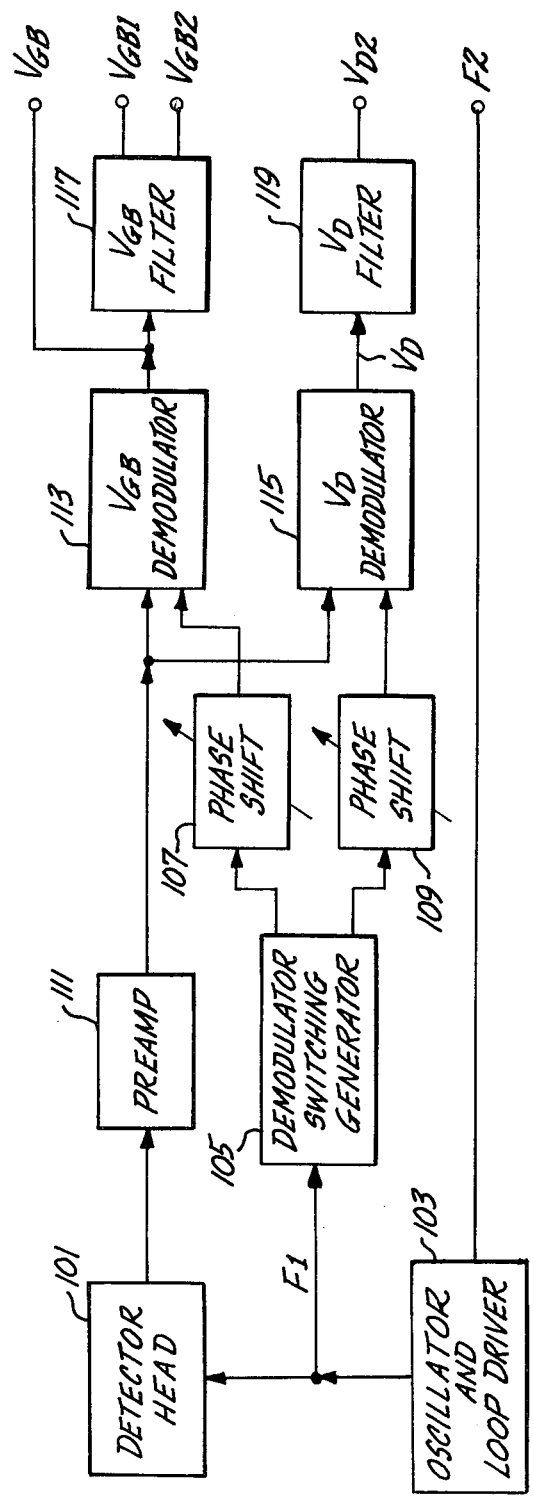

FIG. 13 is a block diagram of an alternative embodiment of a signal production subsystem formed in accordance with the invention and comprises: a detector head 101; an oscillator and loop driver 103; a demodulator switching generator 105; first and second controllable phase shift circuits 107 and 109; a preamplifier 111; a $V_{GB}$ demodulator 113; a $V_D$ demodulator 115; a $V_{GB}$ filter 117; and, a $V_D$ filter 119. Preferably, the detector head 101; the oscillator and loop driver 103; the demodulator switching generator 105; the $V_{GB}$ filter 117; and, the $V_D$ filter 119 are formed and operate in a manner identical to the formation and operation of similarly named components illustrated in FIG. 1 and heretofor described. Further the $V_{GB}$ and $V_D$ demodulators 113 and 115 may be formed in the same manner as the $V_X$ and $V_R$ demodulators illustrated in FIG. 1 and heretofore described. Also, the preamplifier 111 may be formed in the same manner as the phase shift preamplifier 37, without the phase shift.

As with the signal production system illustrated in FIG. 1, the oscillator and loop driver illustrated in FIG. 13 produces an F1 signal that is applied to the detector head 101 and the demodulator switching generator 105; and, and F2 signal that is applied to the signal processor. The receive coil housed in the detector head 101 is connected to the preamplifier 111, which amplifies voltage fluctuations created in the receive coil by a target and/or mineralized ground when the detector head passes over the ground. The output of the preamplifier is applied to the unknown signal inputs of the $V_{GB}$ and $V_D$ demodulators 113 and 115. The two demodulation signals produced by the demodulator switching generator 105 are each applied to the input of one of the phase shift circuits 107 and 109. The output of the first phase shift circuit 107 is connected to the demodulation signal input of the $V_{GB}$ demodulator 113; and, the output of the second phase shift circuit 109 is connected to the demodulation signal input of the $V_D$ demodulator 115.

The $V_{GB}$ signal, formed on the output of the $V_{GB}$ demodulator, is applied to the signal processor and to the $V_{GB}$ filter 117. In the manner previously described, the $V_{GB}$ filter produces the $V_{GB1}$ and $V_{GB2}$ signals. The $V_D$ signal, formed on the output of the $V_D$ demodulator, is applied to the $V_D$ filter 119. The $V_D$ filter, also in the manner previously described, forms the $V_{D2}$ signal.

In operation, the first and second phase shift circuits 107 and 109 and the $V_{GB}$ and $V_D$ demodulators 113 and 115 produce the same type of $V_{GB}$ and $V_D$ signals as the $V_X$ and $V_R$ demodulators 39 and 41 and the $V_{GB}$ and $V_D$ amplifiers 43 and 47 of the signal production system illustrated in FIG. 1 and previously described. The reason for this is that the phase information at the input of the $V_X$ and $V_R$ demodulators is converted into voltage form by these demodulators. Thus, when the magnitude of the $V_X$ and $V_R$ signals are combined by the $V_{GB}$ and $V_D$ amplifiers, phase information is being combined. In the case of the $V_{GB}$ and $V_D$ demodulators, the phase relationship of the demodulation signals is varied before the phase information is changed to voltage form. The end result is the production of substantially identical $V_{GB}$ and $V_D$ signals by both signal production subsystems for an identical target.

Obviously, the form of the signal production subsystem illustrated in FIG. 13 can be changed. For example, the two phase shift circuits 107 and 109 can be connected between the output of the preamplifier 111 and the unknown signal inputs of the $V_{GB}$ and $V_D$ demodulators, respectively, rather than between the demodulator switching generator outputs 105 and the demodulation signal inputs of the $V_{GB}$ and $V_D$ demodulators as illustrated. Or, one phase shift circuit can be connected between one of the outputs of the demodulator switching generator and the demodulation signal input of one of the $V_{GB}/V_D$ demodulators and the other phase shift circuit connected between the output of the preamplifier 111 and the unknown signal input of the other one of the $V_{GB}/V_D$ demodulators.

While preferred embodiments of the invention have been illustrated and described, it will be appreciated that various changes can be made therein. For example, the invention can be implemented in digital circuit form, rather than the illustrated analog circuit form, if desired, without departing from the spirit and scope of the invention. Consequently, the invention can be practiced otherwise than as specifically described herein.

The embodiments of the invention in which an exclusive property or privilege is claimed are defined as follows:

1. A metal detector system with undesirable target and mineralized ground discrimination comprising:
   (A) a signal production subsystem comprising:
      (1) detector means, including coil means and oscillator means for driving said coil means, for producing a detector signal that includes a target component when relative movement occurs between said coil means and a suitably close metal target, said detector signal also including a ground mineralization component when said metal target is buried in mineralized ground;
      (2) an electronic subsystem coupled to said detector means for receiving said detector signal and producing: (a) a ground balance signal containing information about the presence of a target, but substantially no ground mineralization information; and, (b) a discriminate signal containing information about the presence of a target and whether the target is or is not of the type being discriminated against; and,
   (B) a signal processor including:
      (1) dividing means coupled to said electronic subsystem of said signal production subsystem for receiving said ground balance signal and said discriminate signal, dividing said discriminate signal by said ground balance signal and producing pulses on one of two outputs, depending upon whether said target is or is not of the type being discriminated against;
      (2) signal ratio discrimination means coupled to said dividing means for receiving pulses produced by said dividing means on said one of said two outputs and producing a DC control signal whose polarity is dependent upon which one of said two outputs pulses occur; and,
      (3) indicator means coupled to said signal ratio discrimination means for receiving said DC control signal and producing an indication of whether said target is or is not of the type being discriminated against based on the polarity of said DC signal.

2. A metal detector system as claimed in claim 1 wherein said electronic subsystem comprises:
   demodulation means coupled to said detector means for receiving said detector signal and producing two target signals, $V_R$ and $V_X$, both of said target signals including a target component, but only one, $V_X$, including a substantial ground mineralization component when said metal target is buried in mineralized ground;
   first combining means coupled to said demodulation means for receiving said $V_R$ and $V_X$ signals, combining said $V_R$ and $V_X$ signals and producing said ground balance signal containing information about the presence of a target, but substantially no ground mineralization information; and,
   second combining means coupled to said demodulation means for receiving said $V_R$ and $V_X$ signals, combining said $V_R$ and $V_X$ signals and producing said discriminate signal containing information about the presence of a target and whether the target is or is not of the type being discriminated against.

3. A metal detector system as claimed in claim 2 wherein said $V_R$ and $V_X$ signals are in phase quadrature.

4. A metal detector system as claimed in claim 3 wherein said ground balance signal is a ringing signal, $V_{GB2}$, and said discriminate signal is a ringing signal, $V_{D2}$.

5. A metal detector system as claimed in claim 4 wherein said $V_{GB2}$ and $V_{D2}$ ringing signals are in-phase or 180 degrees out of-phase and wherein the in-phase/180 degree out-of-phase status of the $V_{GB2}$ and $V_{D2}$ signals denotes whether the target is or is not of the type being discriminated against.

6. A metal detector system as claimed in claim 2 wherein said ground balance signal is a ringing signal, $V_{GB2}$, and said discriminate signal is a ringing signal, $V_{D2}$.

7. A metal detector system as claimed in claim 6 wherein said $V_{GB2}$ and $V_{D2}$ ringing signals are in-phase or 180 degrees out-of-phase and wherein the in-phase/180 degree out-of-phase status of the $V_{GB2}$ and $V_{D2}$ signals denotes whether the target is or is not of the type being discriminated against.

8. A metal detector system as claimed in claim 2 wherein said demodulation means includes:
 a phase shift preamplifier having its input connected to said coil means of said detection means for phase shifting signals produced in said coil means when relative movement occurs between said coil means and a suitably close metal target;
 a demodulator switching generator connected to said oscillator for receiving the signal applied to said coil means by said oscillator means and for producing a pair of demodulation signals having the same frequency as the frequency of a signal applied to said coil means by said oscillator means, said pair of demodulation signals having a predetermined phase relationship;
 a $V_X$ demodulator having an unknown signal input connected to the output of said phase shift preamplifier and a demodulation signal input connected to one output of said demodulator switching generator, the output of said $V_X$ demodulator forming said $V_X$ signal; and,
 a $V_R$ demodulator having an unknown signal input connected to the output of said phase shift preamplifier and a demodulation signal input connected to the second output of said demodulator switching generator, the output of said $V_R$ demodulator forming said $V_R$ signal.

9. A metal detector system as claimed in claim 8 wherein:
 (A) said first combining means includes:
  (1) a $V_{GB2}$ amplifier having two inputs connected to the output of said $V_X$ and $V_R$ demodulators, said $V_{GB}$ amplifier combining said $V_X$ and $V_R$ signals in a manner that removes substantially all of the ground mineralization components therefrom and produces a $V_{GB}$ signal, said $V_{GB}$ signal being in the form of a pulse when said $V_X$ and $V_R$ signals include a target component; and,
  (2) a $V_{GB}$ filter connected to said $V_{GB}$ amplifier for removing remaining ground mineralization information from said $V_{GB}$ signal and converting said $V_{GB}$ signal from pulse form into ringing signal form, $V_{GB2}$;
 (B) said second combining means includes:
  (1) a $V_D$ amplifier having two inputs connected to the outputs of said $V_X$ and $V_R$ demodulators, said $V_D$ amplifier combining said $V_X$ and $V_R$ signal in a manner that produces a $V_D$ target pulse when said $V_X$ and $V_R$ signals include a target component, the polarity of said pulse denoting whether said target is or is not of the type being discriminated against; and,
  (2) a $V_D$ filter connected to the output of said $V_D$ amplifier for removing ground mineralization information from the output of said $V_D$ amplifier and converting said $V_D$ target pulses from pulse form into ringing signal form, $V_{D2}$, that is in-phase or 180 degrees out-of-phase with said $V_{GB2}$ ringing signal and whose in-phase/180 degree out-of-phase status with respect to said $V_{GB2}$ signal denotes whether said target is or is not of the type being discriminated against.

10. A metal detector system as claimed in claim 9 wherein said dividing means includes:
 modulation means for receiving said $V_{GB2}$ ringing signals and producing, in accordance therewith, triangular wave signals whose envelope tracks the envelope of said $V_{GB2}$ ringing signals; and,
 a divider for receiving said triangular signals and said $V_{D2}$ ringing signals, dividing said $V_{D2}$ ringing signals by said triangular wave signals, producing phases whose width relates to the result of said division and directing said pulses to one or the other of two outputs, depending upon whether said target is or is not of the type being discriminated against.

11. A metal detector system as claimed in claim 10 wherein said dividing means also includes an R window circuit connected to receive said $V_{GB2}$ signal and to said divider for enabling said divider only during the period of time a $V_{GB2}$ ringing signal of predetermined magnitude is produced by said $V_{GB2}$ filter.

12. A metal detector system as claimed in claim 11 wherein:
 (A) said R window circuit also produces a pair of anti-phase signals, $+R$ and $-R$, having the same frequency as the frequency of said $V_{GB2}$ ringing signals and phase coherent therewith; and,
 (B) modulation means includes:
  (1) a rectifier, connected to receive said $V_{GB2}$ and said $+R$ and $-R$ signals, for producing a pair of fully rectified bi-polar signals, $+RR$ and $-RR$, that track said $V_{GB2}$ ringing signals; and,
  (2) a triangle modulator connected to said rectifier for receiving said $+RR$ and $-RR$ signals and producing said triangular signal that tracks the envelope of said $V_{GB2}$ signals.

13. A metal detector system as claimed in claim 12 wherein said signal ratio discrimination means comprises a signal ratio discrimination circuit connected to said divider for receiving said two outputs and to said rectifier for receiving said $+RR$ and $-RR$ signals and for producing, in accordance therewith, said DC control signal.

14. A metal detector system as claimed in claim 13 wherein said signal ratio discrimination circuit includes: switching means having signal inputs connected to receive said $+RR$ and $-RR$ signals produced by said rectifier and control inputs connected to the two outputs of said divider for producing a series of pulses that track either said $+RR$ or $-RR$ signals depending upon which of the outputs of said divider pulses occur; and, an integrator for receiving said pulses and integrating said pulses to produce said DC control signal.

15. A metal detector system as claimed in claim 14 wherein said indicator means provides an audio indication.

16. A metal detector system as claimed in claim 15 wherein said indicator means comprises:
- an audio circuit having first and second control inputs, said first control input connected to the output of said signal ratio discrimination circuit;
- a track and hold circuit having an input connected to the output of said $V_{GB}$ amplifier and an output connected to the second control input of said audio circuit; and,
- a mode control circuit for producing a mode control signal, said mode control signal applied to said signal ratio discrimination circuit and to said track and hold circuit to enable one or the other of said signal ratio discrimination circuit and said track and hold circuit to control said audio circuit.

17. A metal detector system as claimed in claim 2 wherein said ground balance signal is a ringing signal, $V_{GB2}$, and said discriminate signal is a phase correlated ringing signal, $V_{D2}$, and said dividing means includes:
- modulation means for receiving said $V_{GB2}$ ringing signals and producing, in accordance therewith, triangular wave signals whose envelope tracks the envelope of said $V_{GB2}$ ringing signals; and,
- a divider for receiving said triangular signals and said $V_{D2}$ ringing signals, diving said $V_{D2}$ ringing signals by said triangular wave signals, producing pulses whose width relates to the result of said division and directing said pulses to one or the other of two outputs, depending upon whether said target is or is not of the type being discriminated against.

18. A metal detector system as claimed in claim 17 wherein said dividing means also includes an R window circuit connected to receive said $V_{GB2}$ signal and to said divider for enabling said divider only during the period of time a $V_{GB2}$ ringing signal of predetermined magnitude is produced by a first combining means.

19. A metal detector system as claimed in claim 18 wherein:
(A) said R window circuit also produces a pair of anti-phase signals, $+R$ and $-R$, having the same frequency as the frequency of said $V_{GB2}$ ringing signals and phase correlated therewith; and,
(B) modulation means includes:
  (1) a rectifier, connected to receive said $V_{GB2}$ and said $+R$ and $-R$ signals, for producing a pair of fully rectified bi-polar signals, $+RR$ and $-RR$, that track said $V_{GB2}$ ringing signals; and,
  (2) a triangle modulator connected to said rectifier for receiving said $+RR$ and $-RR$ signals and producing said triangular signal that tracks the envelope of said $V_{GB2}$ signals.

20. A metal detector system as claimed in claim 19 wherein said signal ratio discrimination means comprises a signal ratio discrimination circuit connected to said divider for receiving said two outputs and to said rectifier for receiving said $+RR$ and $-RR$ signals and for producing in accordance therewith said DC control signal.

21. A metal detector system as claimed in claim 20 wherein said signal ratio discrimination circuit includes:
- switching means having signal inputs connected to receive said $+RR$ and $-RR$ signals produced by said rectifier and control inputs connected to the two outputs of said divider for producing a series of pulses that track either said $+RR$ or $-RR$ signals depending upon which of the outputs of said divider pulses occur; and, an integrator for receiving said pulses and integrating said pulses to produce said DC control signal.

22. A metal detector system as claimed in claim 1 wherein said electronic subsystem comprises:
- first demodulation means coupled to said detecting means for producing said ground balance signal containing information about the presence of a target, but substantially no ground mineralization information; and,
- second demodulation means coupled to said detecting means for producing said discriminate signal containing information about the presence of a target whether the target is or is not of the type being discriminated against.

23. A metal detector system as claimed in claim 22 wherein said ground balance signal is a ringing signal, $V_{GB2}$, and said discriminate signal is a ringing signal, $V_{D2}$.

24. A metal detector system as claimed in claim 23 wherein said $V_{GB2}$ and $V_{D2}$ ringing signals are in-phase or 180 degrees out-of-phase and wherein the in-phase/180 degree out-of-phase status of the $V_{GB2}$ and $V_{D2}$ signals denotes whether the target is or is not of the type being discriminated against.

25. A metal detector system as claimed in claim 24 wherein said dividing means includes:
- modulation means for receiving said $V_{GB2}$ ringing signals and producing, in accordance therewith, triangular wave signals whose envelope tracks the envelope of said $V_{GB2}$ ringing signals; and,
- a divider for receiving said triangular signals and said $V_{D2}$ ringing signals, dividing said $V_{D2}$ ringing signals by said triangular wave signals, producing pulses whose width relates to the result of said division and directing said pulses to one or the other of two outputs, depending upon whether said target is or is not of the type being discriminated against.

26. A metal detector system as claimed in claim 25 wherein said dividing means also includes an R window circuit connected to receive said $V_{GB2}$ signal and to said divider for enabling said divider only during the period of time a $V_{GB2}$ ringing signal of predetermined magnitude is produced by said $V_{GB2}$ filter.

27. A metal detector system as claimed in claim 26 wherein:
(A) said R window circuit also produces a pair of anti-phase signals, $+R$ and $-R$, having the same frequency as the frequency of said $V_{GB2}$ ringing signals and phase correlated therewith; and,
(B) modulation means includes:
  (1) a rectifier, connected to receive said $V_{GB2}$ and said $+R$ and $-R$ signals, for producing a pair of fully rectified bi-polar signals, $+RR$ and $-RR$, that track said $V_{GB2}$ ringing signals; and,
  (2) a triangle modulator connected to said rectifier for receiving said $+RR$ and $-RR$ signals and producing said triangular signal that tracks the envelope of said $V_{GB2}$ signals.

28. A metal detector system as claimed in claim 27 wherein said signal ratio discrimination means comprises a signal ratio discrimination circuit connected to said divider for receiving said two outputs and to said rectifier for receiving said $+RR$ and $-RR$ signals and for producing, in accordance therewith, said DC control signal.

29. A metal detector system as claimed in claim 28 wherein said signal ratio discrimination circuit includes: switching means having signal inputs connected to receive said +RR and −RR signals produced by said rectifier and control inputs connected to the two outputs of said divider for producing a series of pulses that track either said +RR or −RR signals depending upon which of the outputs of said divider pulses occur; and, an integrator for receiving said pulses and integratig said pulses to produce said DC control signal.

30. A metal detector system as claimed in claim 29 wherein said indicator means provides an audio indication.

31. A metal detector system as claimed in claim 30 wherein said indicator means comprises:
an audio circuit having first and second control inputs, said first control input connected to the output of said signal ratio discrimination circuit;
a track and hold circuit having an input connected to the output of said $V_{GB}$ amplifier and an output connected to the second control input of said audio circuit; and,
a mode control circuit for producing a mode control signal, said mode control signal applied to said signal ratio discrimination circuit and to said track and hold circuit to enable one or the other of said signal ratio discrimination circuit and said track and hold circuit to control said audio circuit.

32. A metal detector system as claimed in claim 1 wherein said ground balance signal is a ringing signal, $V_{GB2}$, and said discriminate signal is a ringing signal, $V_{D2}$.

33. A metal detector system as claimed in claim 32 wherein said $V_{GB2}$ and $V_{D2}$ ringing signals are in-phase or 180 degrees out-of-phase and wherein the in-phase/180 degree out-of-phase status of the $V_{GB2}$ and $V_{D2}$ signals denotes whether the target is or is not of the type being discriminated against.

34. A metal detector system as claimed in claim 34 wherein said dividing means includes:
modulation means for receiving said $V_{GB2}$ ringing signals and producing, in accordance therewith, triangular wave signals whose envelope tracks the envelope of said $V_{GB2}$ ringing signals; and,
a divider for receiving said triangular signals and said $V_{D2}$ ringing signals, dividing said $V_{D2}$ ringing signals by said triangular wave signals, producing pulses whose width relates to the result of said division and directing said pulses to one or the other of two outputs, depending upon whether said target is or is not of the type being discriminated against.

35. A metal detector system as claimed in claim 34 wherein said dividing means also includes an R window circuit connected to receive said $V_{GB2}$ signal and to said divider for enabling said divider only during the period of time a $V_{GB2}$ ringing signal of predetermined magnitude is produced by said $V_{GB2}$ filter.

36. A metal detector system as claimed in claim 35 wherein:
(A) said R window circuit also produces a pair of anti-phase signals, +R and −R, having the same frequency as the frequency of said $V_{GB2}$ ringing signals and phase correlated therewith; and,
(B) modulation means includes:
(1) a rectifier, connected to receive said $V_{GB2}$ and said +R and −R signals, for producing a pair of fully rectified bi-polar signals, +RR and −RR, that track said $V_{GB2}$ ringing signals; and,
(2) a triangle modulator connected to said rectifier for receiving said +RR and −RR signals and producing said triangular signal that tracks the envelope of said $V_{GB2}$ signals.

37. A metal detector system as claimed in claim 36 wherein said signal ratio discrimination means comprises a signal ratio discrimination circuit connected to said divider for receiving said two outputs and to said rectifier for receiving said +RR and −RR signals and for producing, in accordance therewith, said DC control signal.

38. A metal detector system as claimed in claim 37 wherein said signal ratio discrimination circuit includes: switching means having signal inputs connected to receive said +RR and −RR signals produced by said rectifier and control inputs connected to the two outputs of said divider for producing a series of pulses that track either said +RR or −RR signals depending upon which of the outputs of said divider pulses occur; and, an integrator for receiving said pulses and integrating said pulses to produce said DC control signal.

39. A metal detector system as claimed in claim 38 wherein said indicator means provides an audio indication.

40. A metal detector system as claimed in claim 39 wherein said indicator means comprises:
an audio circuit having first and second control inputs, said first control input connected to the output of said signal ratio discrimination circuit;
a track and hold circuit having an input connected to the output of said $V_{GB}$ amplifier and an output connected to the second control input of said audio circuit; and,
a mode control circuit for producing a mode control signal, said mode control signal applied to said signal ratio discrimination circuit and to said track and hold circuit to enable one or the other of said signal ratio discrimination circuit and said track and hold circuit to control said audio circuit.

* * * * *

UNITED STATES PATENT AND TRADEMARK OFFICE
CERTIFICATE OF CORRECTION

PATENT NO. : 4,470,015

DATED : September 4, 1984

INVENTOR(S) : Richard E. Hirschi et al.

It is certified that error appears in the above-identified patent and that said Letters Patent is hereby corrected as shown below:

Column 2, line 6: "group" should be --ground--
Column 31, line 9: "out of-phase" should be --out-of-phase--
Column 32, line 26: "phases" should be --pulses--
Column 33, line 28: "diving" should be --dividing--
Column 33, line 39: "a" should be --said--
Column 34, line 14: insert --and-- after "target"
Column 35, line 9: "integratig" should be --integrating--

Signed and Sealed this

Fifth Day of March 1985

[SEAL]

Attest:

DONALD J. QUIGG

Attesting Officer

Acting Commissioner of Patents and Trademarks